(12) United States Patent
Okita et al.

(10) Patent No.: US 6,422,945 B1
(45) Date of Patent: Jul. 23, 2002

(54) TARGET HITTING GAME MACHINE

(75) Inventors: Katsunori Okita, Kobe; Tadasu Kitae, Nishinomiya; Kazutaka Kubota, Akashi; Hirofumi Mamitsu, Himeji; Yuuki Harano, Kobe; Satoru Yoshida, Toyonaka; Shinya Ishida, Kokubunji, all of (JP)

(73) Assignee: Konami Corporation, Tokyo-to (JP)

( * ) Notice: Subject to any disclaimer, the term of this patent is extended or adjusted under 35 U.S.C. 154(b) by 0 days.

(21) Appl. No.: 09/723,040

(22) Filed: Nov. 27, 2000

(30) Foreign Application Priority Data

Nov. 25, 1999 (JP) .......................................... 11-335112

(51) Int. Cl.[7] .............................................. A63B 67/00
(52) U.S. Cl. ............................................ 463/49; 463/8
(58) Field of Search ............................... 463/8, 48, 49, 463/50, 52, 53, 54, 56; 273/440, 440.1; 482/4

(56) References Cited

U.S. PATENT DOCUMENTS

| | | | | |
|---|---|---|---|---|
| 3,843,128 A | * | 10/1974 | Licitis et al. ............ | 273/101.2 |
| 4,088,315 A | * | 5/1978 | Snhemmel ...................... | 482/4 |
| 4,147,355 A | * | 4/1979 | Barlow et al. ........... | 273/101.1 |
| 4,353,545 A | * | 10/1982 | Anderson ....................... | 482/4 |
| 4,401,303 A | * | 8/1983 | Anderson et al. ............... | 482/4 |
| 4,491,324 A | * | 1/1985 | Yoshida ..................... | 273/85 G |
| 5,221,243 A | * | 6/1993 | Walker ......................... | 482/83 |
| 5,324,043 A | * | 6/1994 | Estrella ..................... | 273/392 |
| 5,613,925 A | * | 3/1997 | Miasserian .................... | 482/83 |
| 5,733,193 A | * | 3/1998 | Allard et al. ................... | 463/8 |

FOREIGN PATENT DOCUMENTS

| | | |
|---|---|---|
| JP | 01274780 | 11/1989 |
| JP | 07213737 | 8/1995 |
| JP | 09173645 | 7/1997 |
| JP | 09276548 | 10/1997 |

* cited by examiner

*Primary Examiner*—Joe H. Cheng
*Assistant Examiner*—Kim T. Nguyen
(74) *Attorney, Agent, or Firm*—Jordan and Hamburg LLP

(57) ABSTRACT

A target hitting game machine comprising a main game unit, at least three targets which are arrayed on the left and right sides of the front surface of the main game unit while being located at different height positions on at least one of the left and right sides, each of the targets is movable between a hitting position and a standby position, and a game result evaluating unit for evaluating a game result in accordance with a position of the target, when hit by a player, between the hitting position and the standby position.

24 Claims, 16 Drawing Sheets

TARGET HITTING GAME MACHINE

The present invention relates to a target hitting game machine in which targets being displaced from the back side toward the front side are hit by hands at the front side of a main game unit.

BACKGROUND OF THE INVENTION AND RELATED ART STATEMENT

As a target hitting game machine has been known a game machine for hitting moles jumping out of the game machine.

In the aforementioned mole hitting game machine, whether or not a game player has hit the mole is detected to make only a 1-or-0 judgment, but no stepwise judgment is made in accordance with the hitting timing. Further, the moles are hit on a substantially horizontal plane at a specified height, and are not moved toward the game player. Thus, this game tends to lack ingenuity.

SUMMARY OF THE INVENTION

In view of the above problem residing in the prior art, an object of the present invention is to provide a target hitting game machine which makes a stepwise judgment in accordance with a hitting timing and provides a highly ingenuous game in which targets are moved toward a game player at a plurality of height positions.

In order to fulfill the above object, a target hitting game machine, according to the present invention, comprises a main game unit; at least three targets which are arrayed on the left and right sides of the front surface of the main game unit while being located at different height positions on at least one of the left and right sides, each of the targets is rotatably movable between a hitting position and a standby position; and a game result evaluating unit for evaluating a game result in accordance with a position of the target when hit by a player between the hitting position and the standby position.

These and other objects, features and advantages of the present invention will become more apparent upon a reading of the following detailed description and accompanying drawings.

DETAILED DESCRIPTION OF THE PREFERRED EMBODIMENTS OF THE INVENTION

Hereinafter, one embodiment of the present invention is specifically described.

In this game machine, one of the beginner course, intermediate course and advanced course can be selected. In the case of selecting the beginner course, opponents (enemies) can be changed at maximum three times (three stages) during one game, and the game ends when the game player loses in one of the stages. In the case of selecting the intermediate and advanced courses, opponents (enemies) can be changed at maximum five times during one game, and the game ends when the game player loses in one of the stages. Further, the game enters a continuous hitting state to be described later at an intermediate stage if the game result of the game player is good, whereas the game ends while being played if it is bad. The content of the game is described in detail below.

Figure 1:
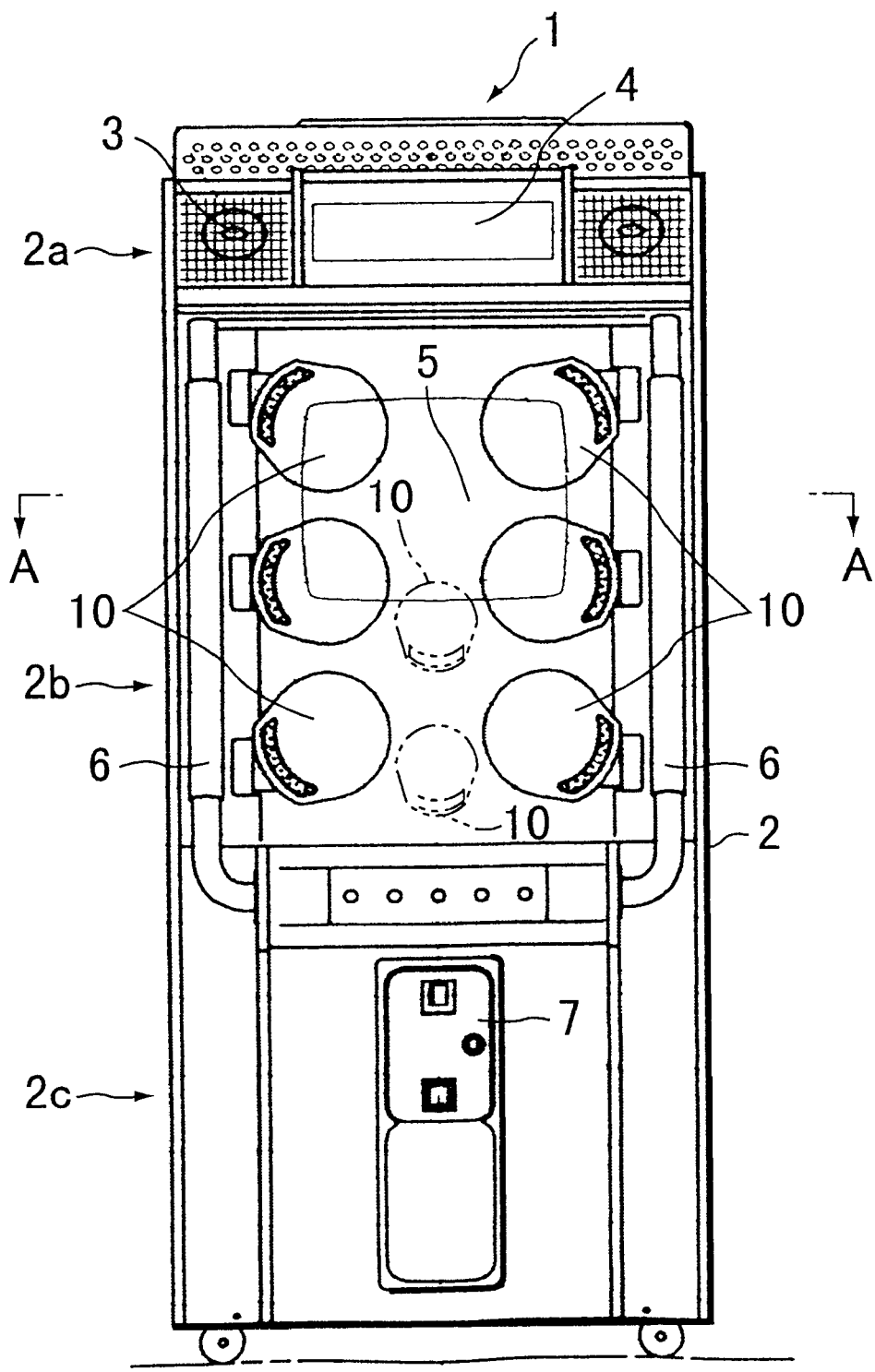
FIG. 1 is a front view of a target hitting game machine according to one embodiment of the invention.
Figure 2:
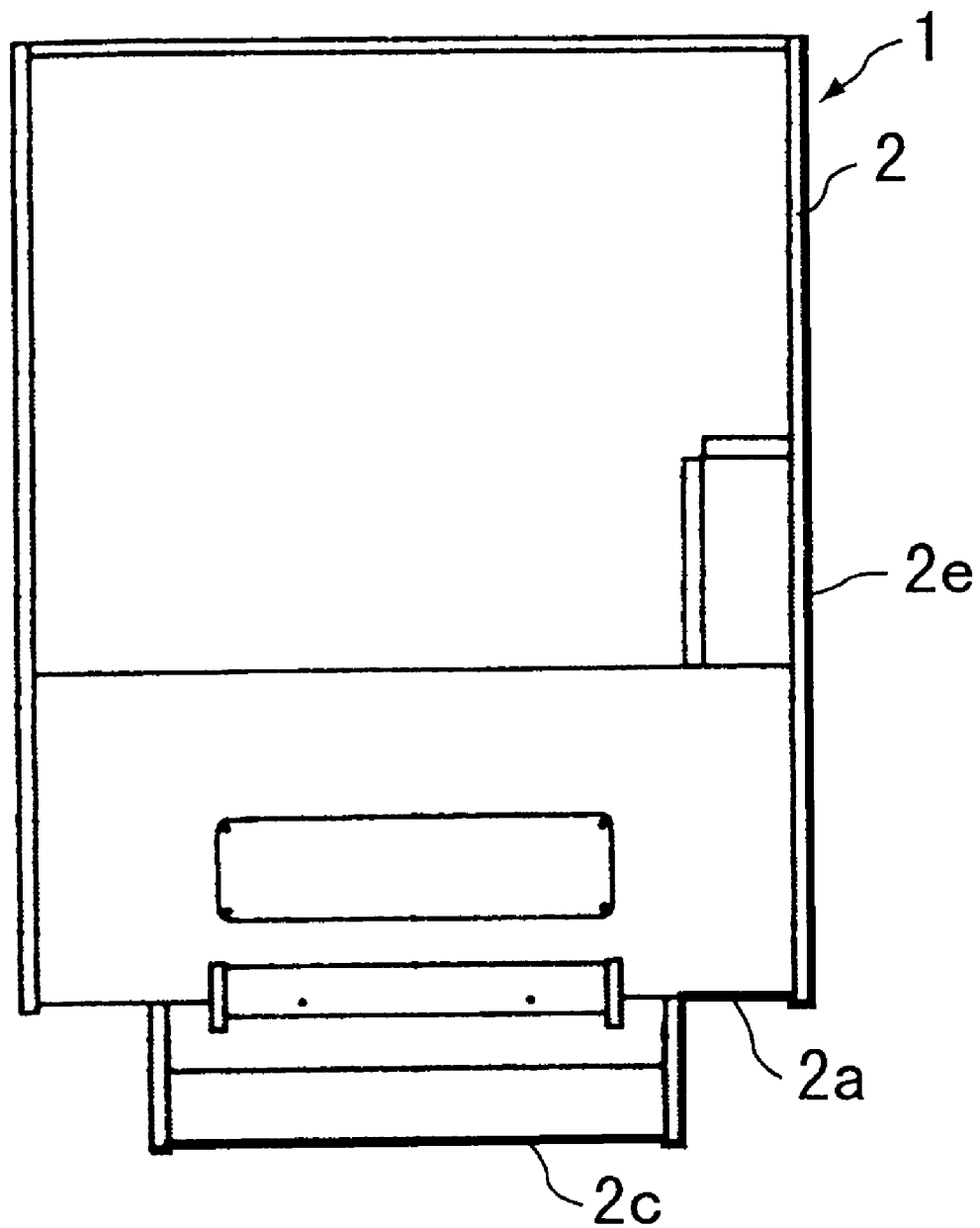
FIG. 2 is a plan view of the target hitting game machine.
Figure 3:
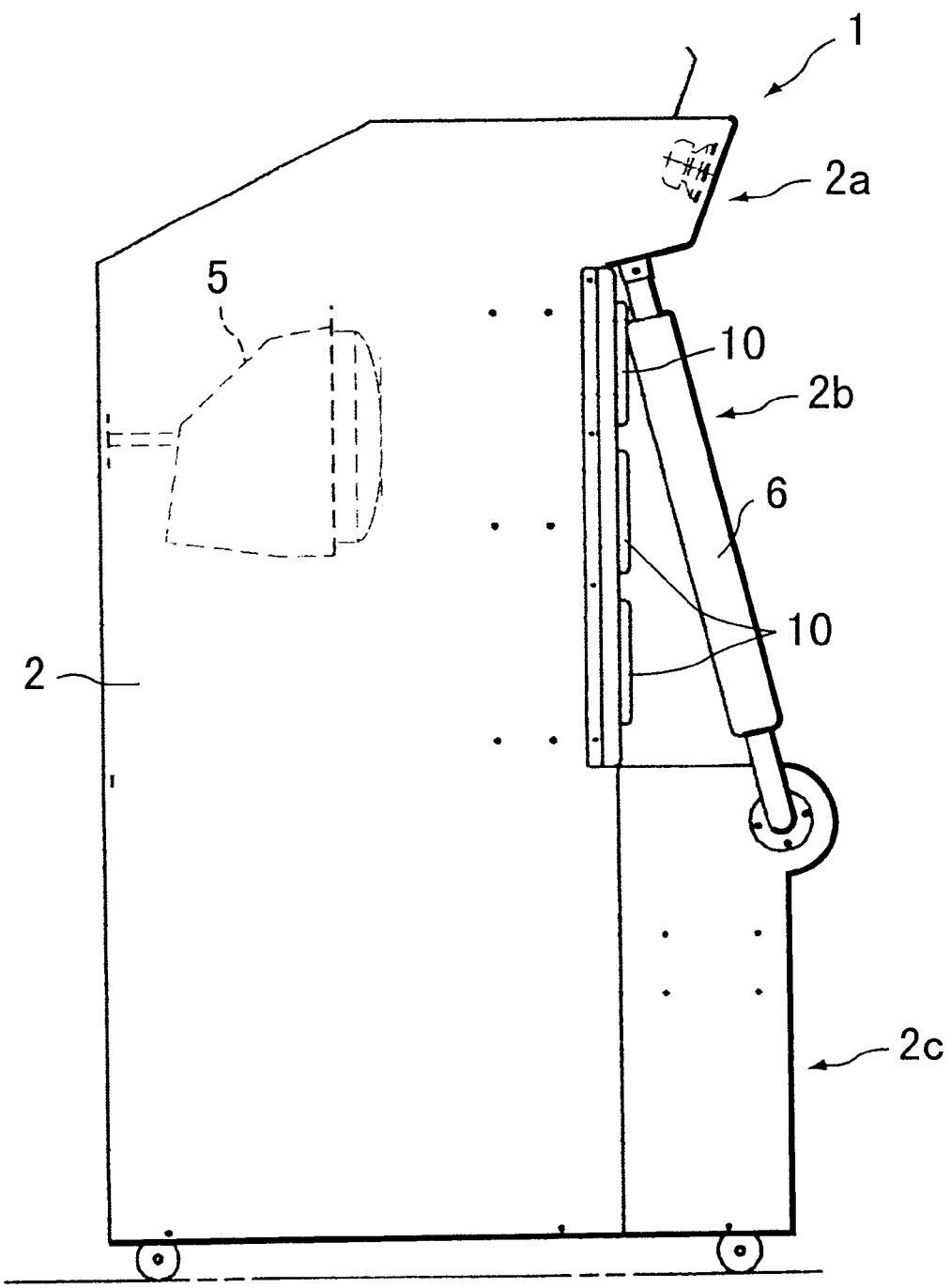
FIG. 3 is a left side view of the target hitting game machine.
Figure 4:
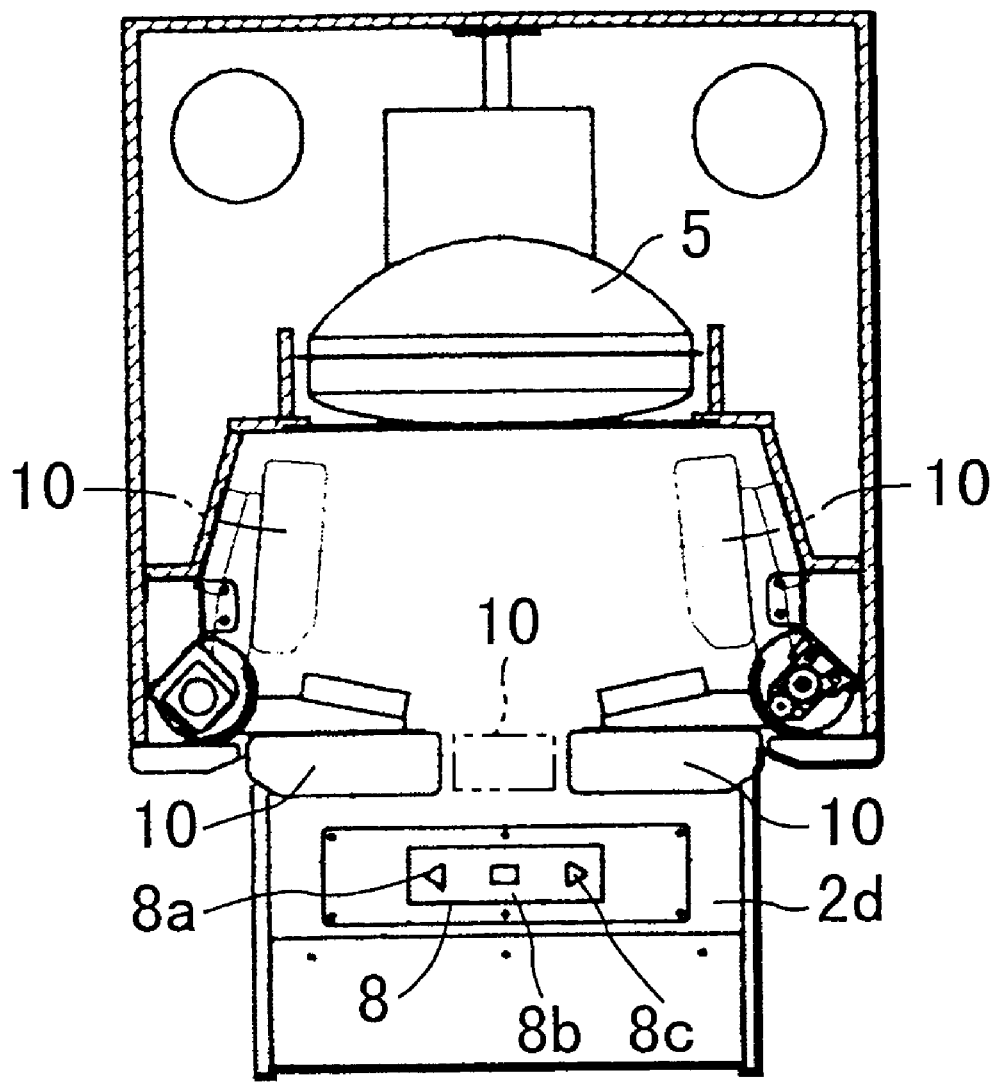
FIG. 4 is a plan view in section along A—A of FIG. 1.

FIG. 1 is a front view of a target hitting game machine according to one embodiment of the invention, FIG. 2 is a plan view thereof, FIG. 3 is a left side view thereof, and FIG. 4 is a plan view in section along A—A of FIG. 1.

This target hitting game machine 1 is provided with a box-shaped main game unit 2, and a plurality of, e.g. six targets 10 provided on the front surface of the main game unit 2.

The main game unit 2 includes loudspeakers 3 and a message display panel 4 at its front top portion 2a; a display screen 5 and protection pads 6 at its front center portion 2b; and a coin inserting device 7 at its front bottom portion 2c. The front bottom portion 2c projects more toward the front than the front center portion 2b, and a control panel 8 is provided on an upper surface 2d of a projecting portion of the bottom portion 2c. The control panel 8 has three operable sections 8a, 8b, 8c, which are used to select the courses and select the opponents. A later-described control system 30 for controlling the operations of the respective sections in the entire target hitting game machine 1 is built in the main game unit 2.

The six targets 10 are arrayed in three each on the left and right sides of the front center portion 2b and at three height levels of high, middle, low. A supporting construction for each target 10 is as follows.

Figure 5:
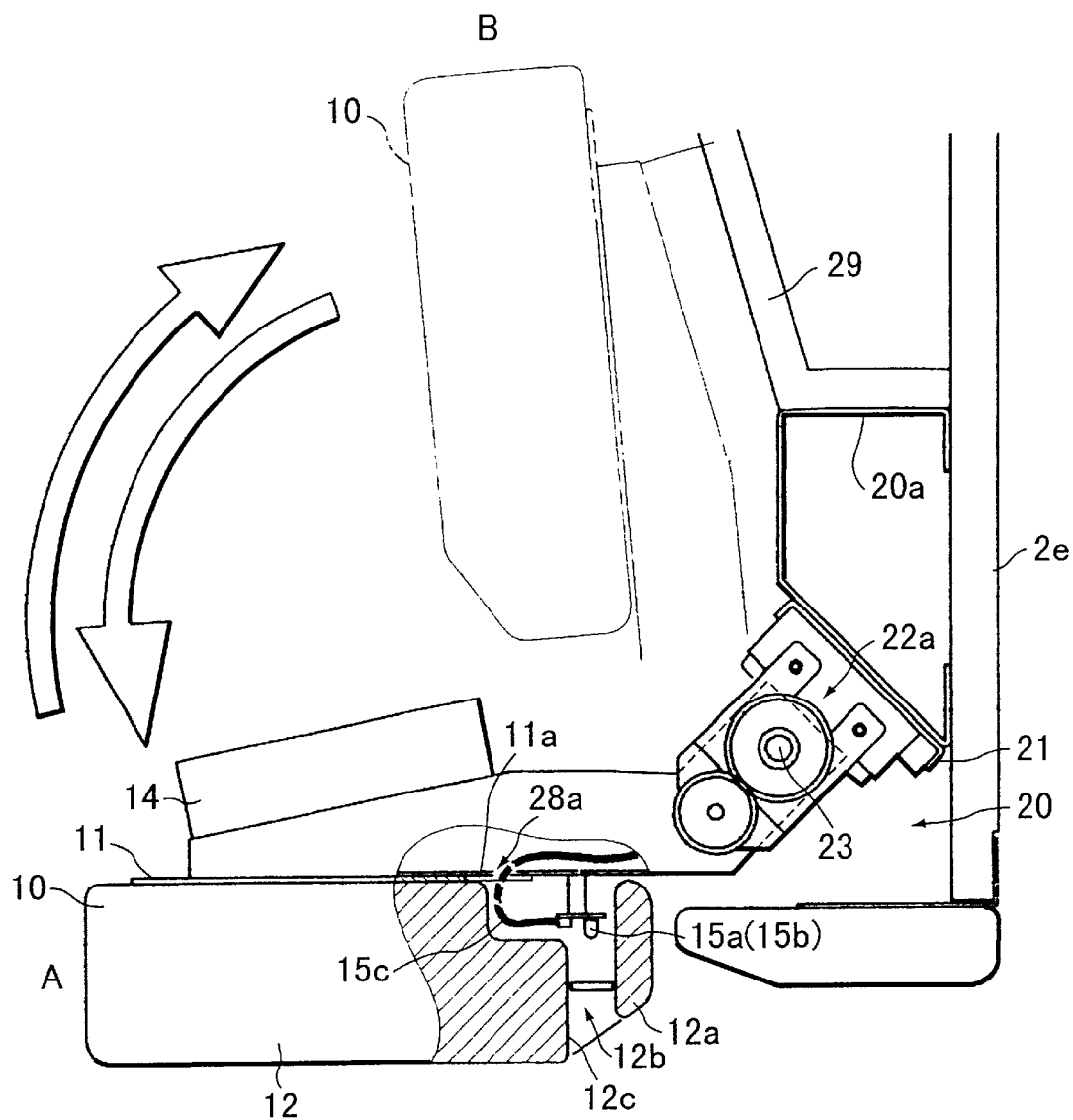
FIG. 5 is a plan view (partly in section) showing a construction near a target provided in the target hitting game machine.
Figure 6:
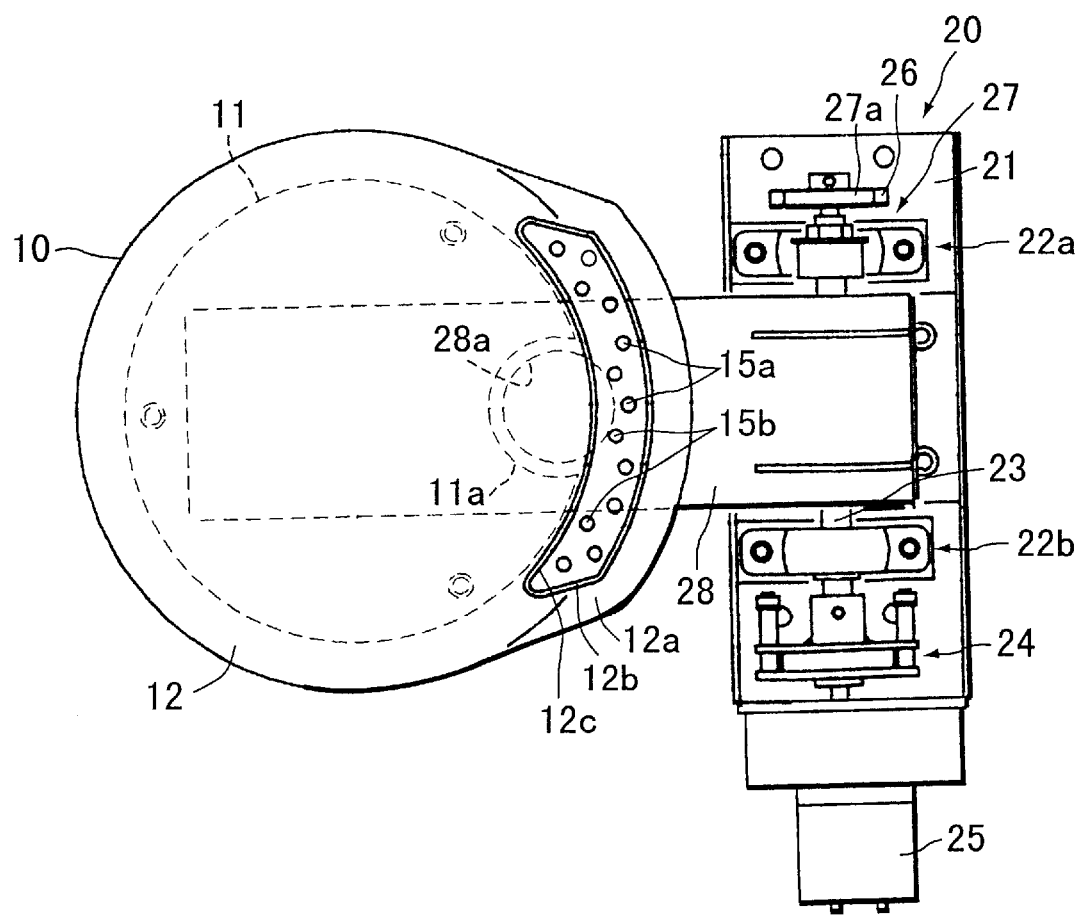
FIG. 6 is a front view (partly in section) when the target is at an intermediate position during its rotational displacement from position B (phantom line) to position A (solid line)
Figure 7:
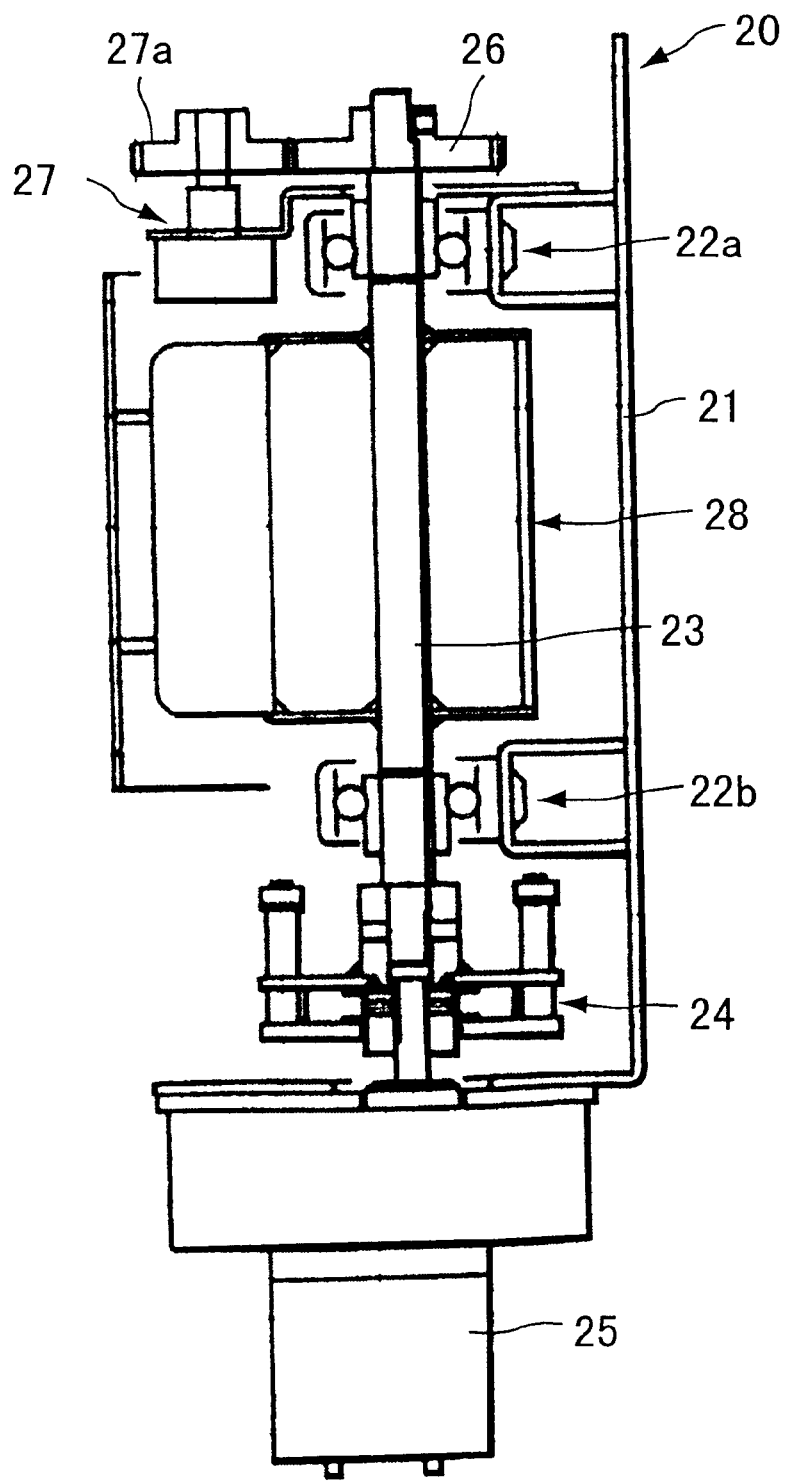
FIG. 7 is a left side view (partly in section, and the target is not shown) of FIG. 6.

FIG. 5 is a plan view (partly in section) showing a construction near the target 10. Further, FIG. 6 is a front view (partly in section) when the target is at an intermediate position during its rotational displacement from position B (phantom line) in FIG. 5 to position A (solid line), and FIG. 7 is a left side view (partly in section, and the target 10 is not shown) of FIG. 6. Here, the position A shown in solid line is a raised position where the target 10 is located at its foremost position and is located on a plane normal to a side surface 2e of the main game unit 2 or on a plane displaced from the former plane by a very small angle. On the other hand, the position B shown in phantom line is a standby position where the target 10 is inclined or laid down to its rearmost side and cannot be hit by the game player when he is facing the front surface of the game machine.

A target supporting mechanism 20 is comprised of a fixed member 20a mounted on the side surface 2e of the main game unit 2, a support plate 21 secured to the fixed member 20a, bearings 22a, 22b provided in upper and lower positions of the support plate 21, a rotatable shaft 23 rotatably supported on the bearings 22a, 22b in forward and reverse directions, a drive motor 25 for giving torques of forward and reverse directions to the bottom end of the rotatable shaft 23 via a torque limiter 24 provided therebetween, a gear 26 fixed to the upper end of the rotatable shaft 23, a detection sensor 27 having a gear 27a in mesh with the gear 26 and adapted to detect an angle of rotation, a target mounting plate 28 mounted on the rotatable shaft 23 between the bearings 22a, 22b, and a stopper 29 provided on the inner side of the side surface 2e. The target 10 is mounted on the front surface of the target mounting plate 28.

In this target supporting mechanism 20, the torque limiter 24 and the rotatable shaft 23 of a drive transmission system receive the torque from the drive motor 25 to rotate. Specifically, when the drive motor 25 is rotated in forward direction, the rotatable shaft 23 and the gear 26 are rotated in the same direction, and the target mounting plate 28 is rotated in the same direction and the gear 27a of the detection sensor 27 is rotated in reverse direction upon receiving the rotational forces of the rotatable shaft 23 and the gear 26. Conversely, when the drive motor 25 is rotated in reverse direction, the rotatable shaft 23 and the gear 26 are rotated in the same direction, and the target mounting plate 28 is rotated in the same direction and the gear 27a of the detection sensor 27 is rotated in forward direction upon receiving the rotational forces of the rotatable shaft 23 and the gear 26. At this time, the detection sensor 27 detects the rotating direction and the rotating amount of the target mounting plate 28. Further, the torque limiter 24 cuts off transmission of force upon receiving a torque of a specified level or higher, so that the target 10 can be displaced to lay down backward upon being hit.

The target 10 is provided with a frame 11 mounted on the target mounting plate 28. The frame 11 is formed with an arcuate hole 11a, and a shock absorbing member 12 including a bulging portion 12a having a substantially circular shape and having one of the left and right sides slightly bulged outwardly, and made of, e.g. urethane is provided on the front surface of the frame 11. The shock absorbing member 12 is formed with an opening 12b for transmitting light, and an inner wall surface 12c of the opening 12b is recessed at its rear side from its front side, so that the wall surface 12c at the rear side is located more outside than the outer periphery of the frame 11. The shock absorbing member 12 may be so provided as to cover the entire outer surface of the target 10.

For examples, blue LEDs 15a and red LEDs 15b are provided in a dispersed manner as a light source inside the opening 12b. The LEDs 15a, 15b are mounted on the target mounting plate 28, and lead wires 15c thereof are drawn out to the rear side through a round hole 28a formed in the target mounting plate 28 along the arcuate hole 11a. Further, a cushioning member 14 for cushioning an impact created when the cushioning member 14 comes into contact with a stopper 29 on the inner side of the side surface 2e is mounted on the rear surface of the target 10. A position where the cushioning member 14 comes into contact with the stopper 29 is the position B.

Figure 8:
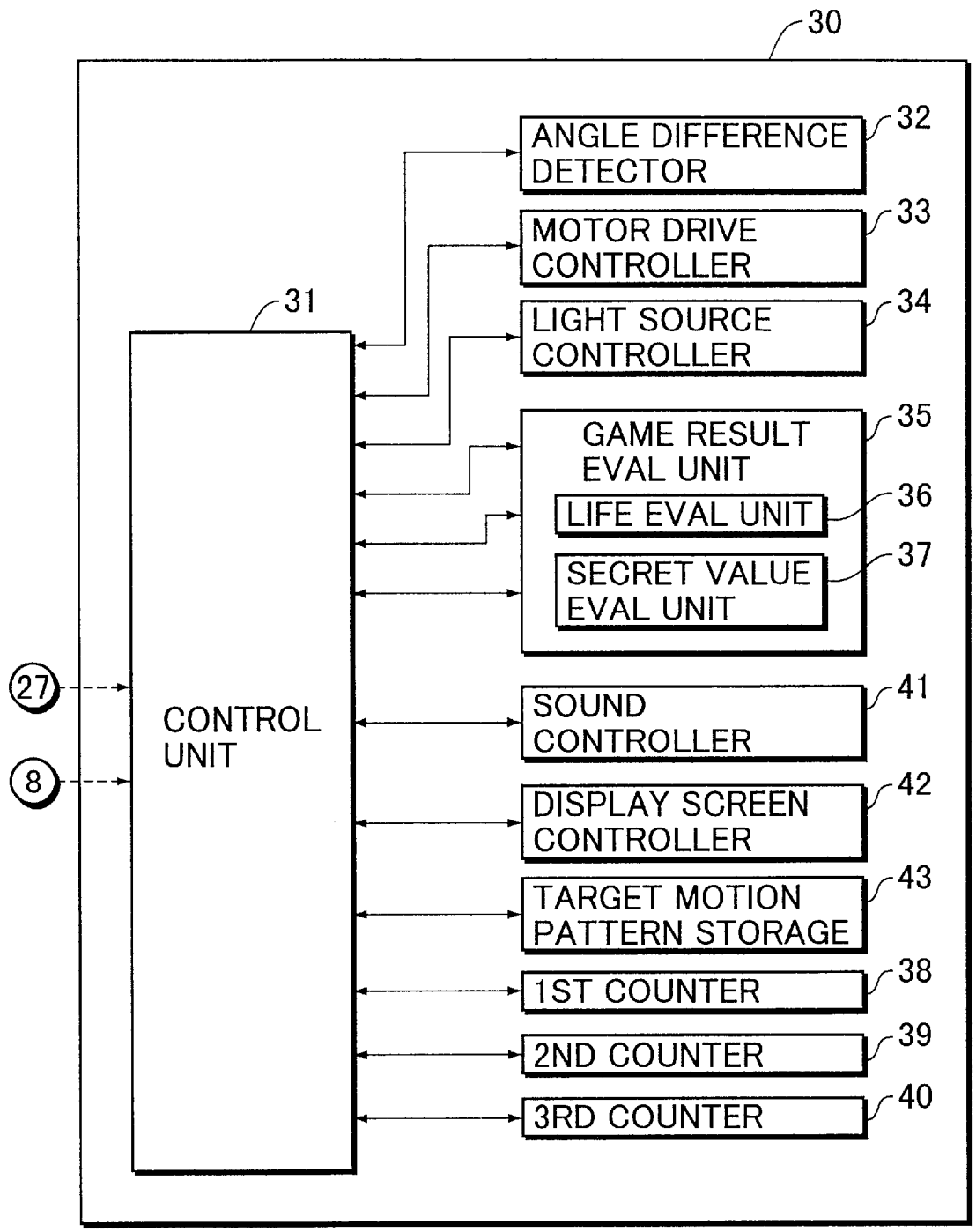
FIG. 8 is a block diagram showing the construction of a control system provided in the target hitting game machine.

FIG. 8 is a block diagram showing the construction of the aforementioned control system 30.

The control system 30 is provided with a control unit 31, an angle difference detector 32 provided in the control unit 31, a motor drive controller 33, a light source controller 34, a game result estimating unit 35, a life estimator 36 and a secrets value estimator 37 provided in the game result estimating unit 35, a first counter 38, a second counter 39, a third counter 40, a sound controller 41, a display screen controller 42 and a target motion pattern storage 43.

The control unit 31 is comprised of, e.g. a CPU, ROM and RAM, and controls the operations of the respective parts of the entire target hitting game machine 1 in accordance with a control program.

The angle difference detector 32 receives an angle of rotation detected by the detection sensor 27; judges that the target 10 has been hit, for example, in the case that a change of angle per unit time exceeds a threshold value set in the angle difference detector 32 in advance; assumes one of the angles already inputted from the detection sensor 27 at which a sudden change in angle has started as an angle at which the target 10 was hit; and calculates an angle difference by the following equation in accordance with the assumed angle and an optimal hitting angle: (angle difference)=(optimal angle)−(angle at which the target 10 was hit). The optimal hittingangle is assumed to be, for example, an angle at which the target 10 is located at the position A.

Minus points are given in the case that the target 10 is hit while being displaced from the laid-down standby position (position B) to the raised hitting position (position A), whereas plus points are given in the opposite case (see TABLE-1, TABLE-2, TABLE-3).

The threshold value used when the target 10 is displaced from the position B to the position A is the same as the one used when the target 10 is conversely displaced from the position A to the position B. These threshold values are different from the one used when the target 10 stays at the position A for a predetermined time. It should be noted that all three threshold values may be differed. Alternatively, these threshold values may be changed to arbitrary values or may be selected from predetermined values. If the threshold values are changeable, setting can be made such that game results corresponding to types of the game players themselves can be ensured even if forces to hit the targets differ between males and females or between adults and children.

The motor drive controller 33 causes the drive motor 25 to rotate by a desired amount in forward or reverse direction in accordance with a command from the control unit 31.

The light source controller 34 controllably turns the LEDs 15a, 15b as the light source on and off. For example, when the target 10 is moved from the position B toward the position A to reach an angle 10° before the optimal hitting angle (position A), the blue LEDs are turned on. Conversely, when the target 10 is moved from the position A toward the position B to reach the angle 10° from the optical hitting angle (position A), the blue LEDs which have been on are turned of f and the red LEDs are turned and kept on until the target 10 reaches the position B.

In the game result estimating unit 35 is stored an estimation table defining judgments in correspondence with the angle differences obtained by the angle difference detector 32 as shown in TABLE-1.

TABLE 1

| ANGLE DIFFERENCE(X) | JUDGMENT |
|---|---|
| $X \leq -20°$ | POOR |
| $-20° < X \leq -10°$ | GOOD |
| $-10° < X \leq -3°$ | GREAT |
| $-3° < X$ | PERFECT |
| $X < +3°$ | PERFECT |
| $+3° \leq X < +10°$ | GREAT |
| $+10° \leq X < +20°$ | GOOD |
| $X \geq +20°$ | MISS (BIG FAILURE) |

Figure 9:
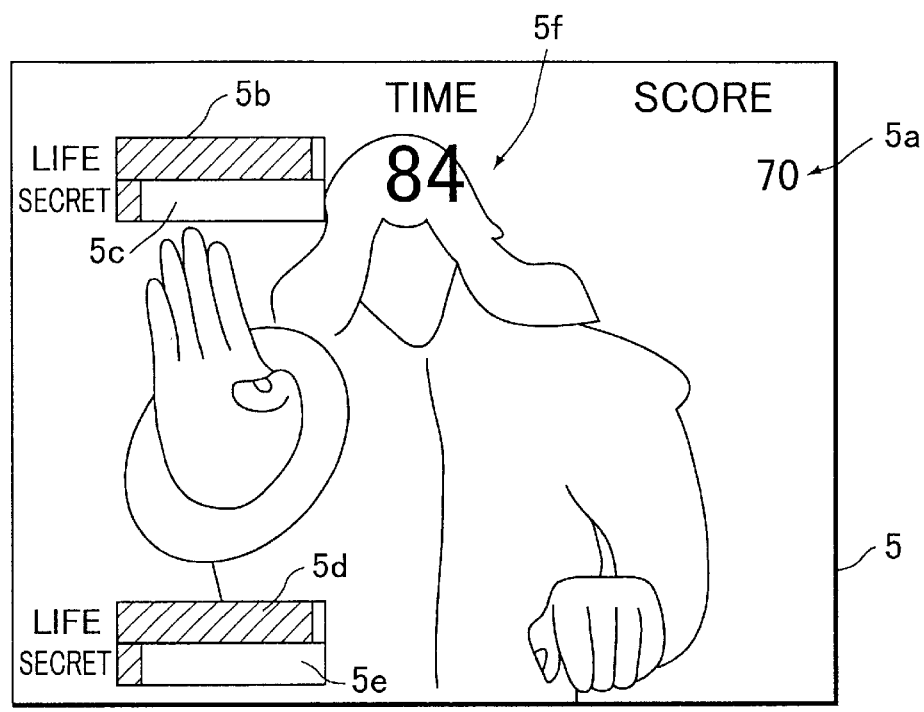
FIG. 9 is a front view showing a display on a screen provided in the target hitting game machine.
Figure 10:
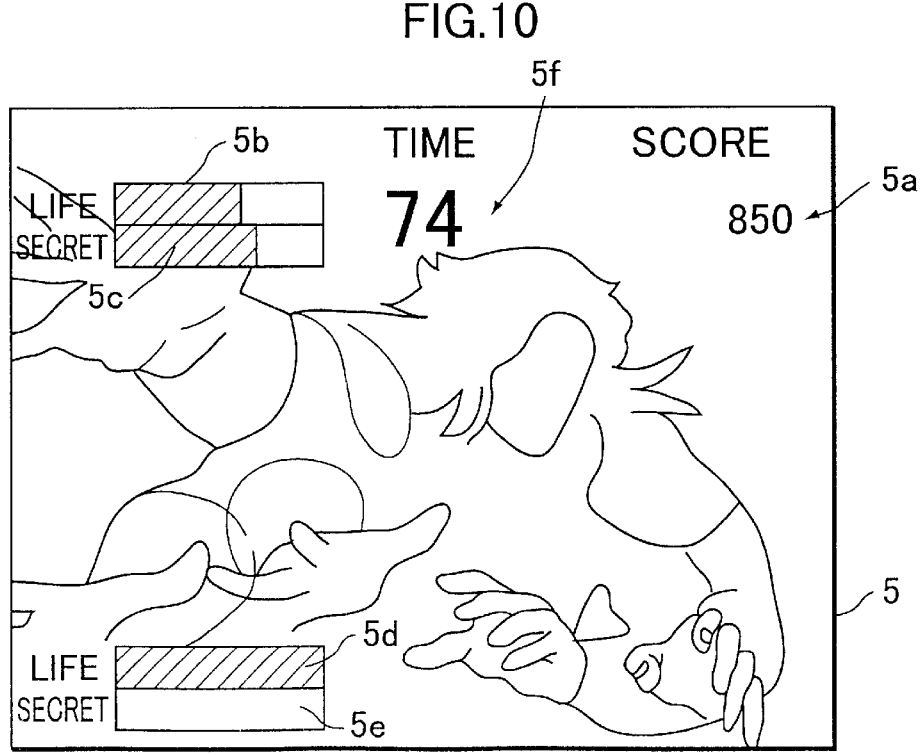
FIG. 10 is a front view showing another display on the screen provided in the target hitting game machine.

The game result estimating unit 35 makes a judgment of "POOR", "GOOD", "GREAT", "PERFECT" or "MISS" based on the angle difference inputted from the angle difference detector 32 and the judgment table. This judgment is made every time the target 10 is hit, and the game result estimating unit 35 outputs a hit mark display signal to be described later to the control unit 31 in the case of the judgment of "GOOD", "GREAT" or "PERFECT", and calculates a total hitting number. This total hitting number (total punching number) is displayed on a score display section 5a as shown in FIGS. 9 and 10. The angle difference of +20° or larger in TABLE-1 is obtained when the game player did not hit the target 10 and when the game player could not hit it although he tried. Thus, in such cases, the game result estimating unit 35 makes a "MISS" judgment of +20° or larger.

In the life estimator 36 is stored a life conversion table defining converted values in correspondence with the angle differences obtained by the angle difference detector 32 as shown in TABLE-2.

TABLE 2

| ANGLE DIFFERENCE | PLAYER'S LIFE | ENEMY'S LIFE |
|---|---|---|
| $X \leq -20°$ | Reduced (−10) | Hardly Reduced (−2) |
| $-20° < X \leq -10°$ | No Change (0) | Slightly Reduced (−5) |
| $-10° < X \leq -3°$ | No Change (0) | Reduced (−10) |
| $-3° < X$ | No Change (0) | Fairly Reduced (−20) |
| $X < +3°$ | No Change (0) | Fairly Reduced (−20) |
| $+3° \leq X < +10°$ | No Change (0) | Reduced (−10) |
| $+10° \leq X < +20°$ | No Change (0) | Slightly Reduced (−5) |
| $X \geq +20°$ | Fairly Reduced (−20) | Not Reduced (0) |

The life estimator 36 converts the player's life and the enemy's life into values in accordance with the angle difference inputted from the angle difference detector 32 and the life conversion table. The player's life value is obtained by subtracting a sum of the converted values from an initially set value, and is displayed as a scale in a display section 5b shown in FIGS. 9 and 10. If the player's life value becomes 0, this is used to judge the end of the game even if there is/are remaining stage(s). The enemy's life value is obtained by subtracting a sum of the converted values from an initially set value, and is displayed as a scale in a display section 5d shown in FIGS. 9 and 10. When the enemy's life value becomes 0, this is used to judge the advancement into the next stage.

In the secrets estimator 37 is stored a secrets conversion table defining converted values in correspondence with the angle differences obtained by the angle difference detector 32 as shown in TABLE-3.

TABLE 3

| ANGLE DIFFERENCE | PLAYER'S SECRETS VALUE | ENEMY'S SECRETS VALUE |
|---|---|---|
| $X \leq -20°$ | No Change (0) | Increased (+5) |
| $-20° < X \leq -10°$ | Slightly Increased (+3) | Slightly Increased (+3) |
| $-10° < X \leq -3°$ | Increased (+5) | Finely Increased (+1) |
| $-3° < X$ | Fairly Increased (+10) | No Change (0) |
| $X < +3°$ | Fairly Increased (+10) | No Change (0) |
| $+3° \leq X < +10°$ | Increased (+5) | Finely Increased (+1) |
| $+10° \leq X < +20°$ | Slightly Increased (+3) | Slightly Increased (+3) |
| $X \geq +20°$ | Reduced (−10) | Fairly Increased (+20) |

Figure 16:
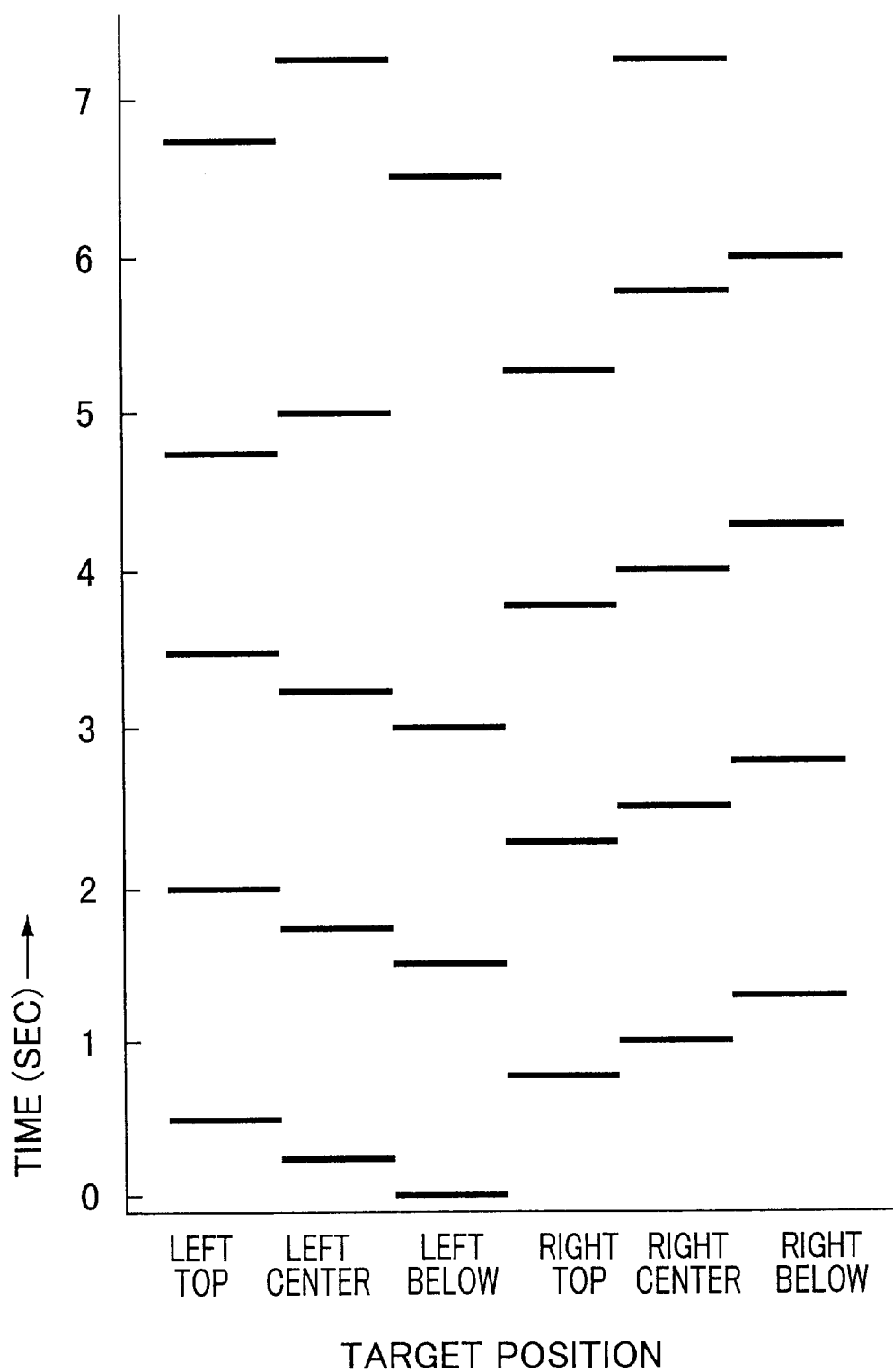
FIG. 16 is a diagram showing an example of a more difficult pattern adopted in the "Usual Enemy Punching Attack Processing" executed in the target hitting game machine.

The secrets value estimator 37 converts the player's secrets and the enemy's secrets into values in accordance with the angle difference inputted from the angle difference detector 32 and the secrets conversion table. The player's secrets value is displayed as a scale in a display section 5c shown in FIGS. 9 and 10. If the player's secrets value reaches a predetermined value or higher, this fact is used to switch the game to a game of secrets midway, i.e. to a "Player's Mortal Punching Attack Processing". The enemy's secrets value is displayed as a scale in a display section 5e shown in FIGS. 9 and 10. When the enemy's secrets value reaches a predetermined value or higher, this is used for a judgment to displace the targets 10 in a more difficult pattern as shown in FIG. 16 to be described later.

The first counter 38 subtracts the count value one by one from a value corresponding to a time limit every time a predetermined time passes after the operation start of the target hitting game machine. The second counter 39 adds one to the count value every time a predetermined time passes after the start of the "Usual Enemy Punching Attack Processing" to be described later. The third counter 40 adds one to the count value every time a predetermined time passes after the start of the "Player's Mortal Punching Attack Processing" to be described later.

The sound controller 41 controls a sound output from the loudspeakers 3 in accordance with a command from the control unit 31.

Figure 15:
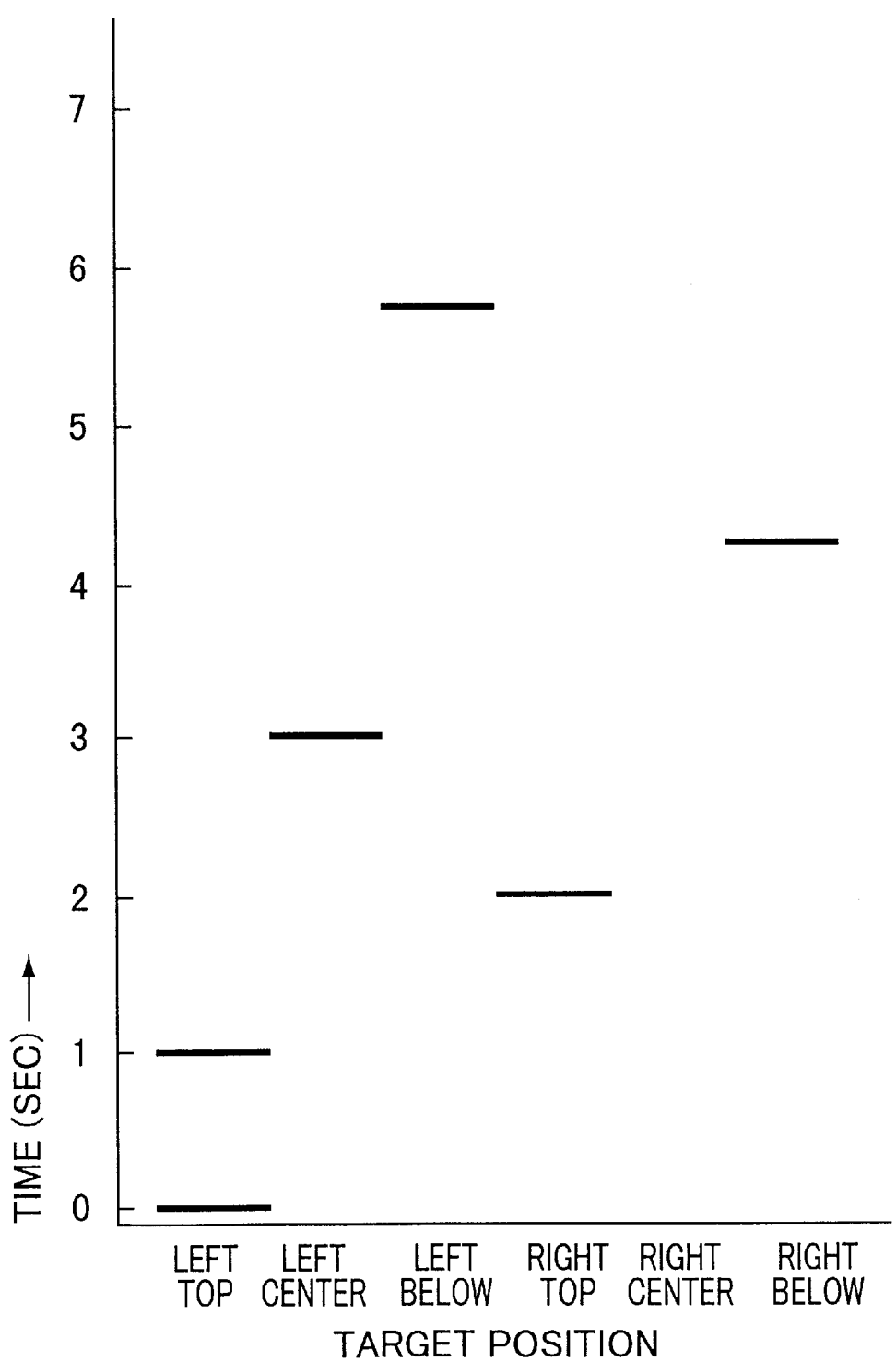
FIG. 15 is a diagram showing an example of a specified pattern adopted in the "Usual Enemy Punching Attack Processing" executed in the target hitting game machine.

In the target motion pattern storage 43 are stored a plurality of specified patterns in which the targets 10 are displaced, the specified patterns being sorted for the respective beginner, intermediate and advanced courses. FIG. 15 shows one of the specified patterns. Thick horizontal lines represent timings at which the targets 10 are displaced from the position B to the position A. These specified patterns correspond to the above "Usual Enemy Punching Attack Processing" and are separately provided for the respective opponents (characters). Further, a more difficult pattern disadvantageous to the game player and used when the secrets value of the opponent increases to a predetermined value or larger as described later is also prepared for each of the plurality of specified patterns. These more difficult patterns are also stored in the target motion pattern storage 43. FIG. 16 shows one of the more difficult patterns. Thick horizontal lines represent timings at which the targets 10 are displaced from the position B to the position A. The pattern of FIG. 16 differs from that of FIG. 15 in that the waiting time of the targets at the standby positions are shortened and the sequence of motions of the targets is changed.

In the target motion pattern storage 43 are also stored opponents (characters) corresponding to the respective specified patterns. The opponents are displayed on the display screen 5 as still images at the time of selecting the pattern, and are displaced on the display screen 5 as animated images whose hands and other body parts are moved at speeds corresponding to the respective characters after the start of the game. The animated images are preferably displayed such that the left and right hands and body parts and attacking height positions of the character displayed on the display screen 5 correspond to the left and right sides and height positions of the targets 10. In such a case, the motions of the targets 10 correspond to the motions of the character.

The aforementioned course selection is made by selecting one of the respective beginner, intermediate and advanced courses displayed on the display screen 5 by means of the operable section 8a, 8c and pushing the operable section 8b. Further, the selection of opponents (characters) is made by successively selecting and determining a plurality of opponents (corresponding to the number of stages) displayed on the display screen 5 in the same manner as above. Instead of being stored in the target pattern storage 43, the still and animated images of the characters may be stored in an other storage separately provided.

In the target motion pattern storage 43 are also stored specified patterns in which all the targets 10 are continuously moved, i.e. the states thereof are continuously changed from the laid-down state, to the raised state, to the laid-down state, and again to the raised state immediately after reaching the laid-down state to cause the game player to perform continuos hitting motions. These specified patterns necessitating the continuous hitting motions correspond to a "Player's Mortal Punching Attack Processing", to which the game is switched midway from the "Usual Enemy Punching Attack Processing" when the player's secrets value reaches a predetermined value or larger.

The display screen controller 42 controls the content of the video image on the display screen 5 in accordance with a command from the control unit 31. Specifically, the display screen controller 42 controls the displays as follows. In response to a command from the control unit 31, the display screen controller 42 displays a character stored in the target motion pattern storage 43 as a still image or an animated image. Further, as described above, if the game result estimating unit 35 makes a judgment of, e.g. "GOOD", "GREAT" or "PERFECT", it judges that the target 10 was hit and outputs a signal to the control unit 31 to cause a hit mark to be displayed on a body part of the character displayed as an animated image corresponding to the position of the hit target 10. Upon receipt of this signal, the display screen controller 42 causes, for example, a mark "x" to be displayed or a circular white portion to momentarily radiate on the corresponding body part of the character as a hit mark. The hit mark may be any other suitable mark.

Here, if the upper left target 10 when viewed from the game player in FIG. 1 is hit, the hit mark is displayed on the right side of the head of the character. The hit mark is displayed on the right side of the chest of the character if the middle left target 10 is hit; it is displayed on the right side of the trunk of the character if the lower left target 10 is hit; it is displayed on the left side of the head of the character if the upper right target 10 is hit; it is displayed on the left side of the chest of the character if the middle right target 10 is hit; and it is displayed on the left side of the trunk of the character if the lower right target 10 is hit.

The hit mark is preferably displayed at the timing simultaneous with the one at which the corresponding target 10 is actually hit so as to give the game player an excitement.

Figure 11:
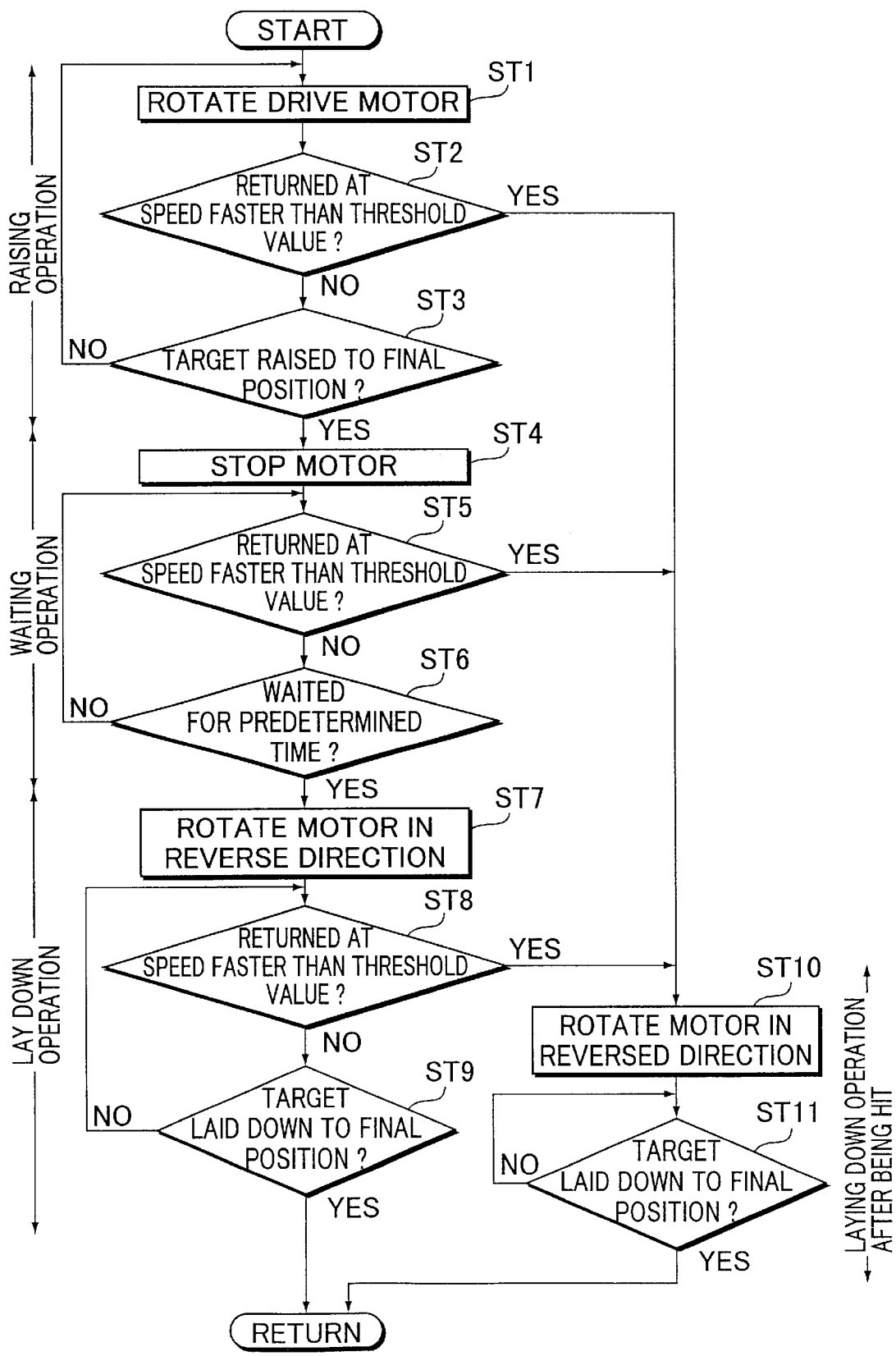
FIG. 11 is a flow chart showing a drive control of a drive motor provided in the target hitting game machine.

Next, the drive control for the drive motor is described with reference to FIG. 11.

Upon the start of the game, the motor drive controller 33 rotates the drive motor 25 in forward direction to control the target 10 to displace from the position B to the position A (Step ST1). It is then discriminated whether the target 10 has been hit by the game player during the displacement of the target 10 to return from the position A to the position B at a specified speed (corresponding to the aforementioned threshold value) or faster (Step ST2). Step ST10 to be described later follows if the discrimination result is affirmative, whereas Step ST3 follows if it is negative. In Step ST3, it is discriminated whether the target 10 has been raised to the final position, i.e. has reached the position A. Steps ST2, ST3 are repeated until the target 10 is raised to the final position. The rotation of the drive motor 25 is stopped (Step ST4) when the target 10 is raised to the final position.

Upon completion of the processing to raise the target 10, a waiting processing is performed next. Specifically, it is discriminated whether the target 10 has been returned at the specified speed (corresponding to the aforementioned threshold value) or faster by being hit by the game player (Step ST5). Although the above discrimination is made as to whether or not the target 10 has been returned at the specified speed or faster, whether or not the target 10 has been returned to a specified position between the positions A and B may be discriminated.

Step ST10 to be described later follows if the discrimination result in Step ST5 is affirmative. If this discrimination result is negative, it is discriminated whether the target 10 has waited for a predetermined time, i.e. has stayed at the position A for a predetermined time without being hit (Step ST6). A next target lay-down processing is performed if the target 10 has stayed at the position A for the predetermined time.

The target lay-down processing is performed as follows. After the drive motor 25 is rotated in reverse direction (Step ST7), it is then discriminated whether the target 10 has been returned at the specified speed or faster by being hit (Step ST8). Step ST10 to be described later follows if the discrimination result is affirmative. If this discrimination result is negative, the target 10 has been laid down to the final position, i.e. has returned to the position B (Step St9). Steps ST8 and ST9 are repeated until the target 10 returns to the position B, and this routine returns when the target 10 returns to the position B.

In the above control, if the target 10 has been returned at the specified speed or faster in Step ST2 for the target raising processing, in Step ST5 for the waiting processing and in Step ST8 for the target lay-down processing, the drive motor 25 is rotated in reverse direction (Step ST10), and it is repeatedly discriminated whether the target 10 has been laid down to the final position, i.e. has returned to the position B (Step ST11). This routine returns when the target 10 returns to the position B.

Next, contents of operation of the target hitting game machine according to this embodiment are described with reference to FIG. 12.

Upon the start of the game, a plurality of courses indicating degrees of difficulty of the game are displayed on the display screen 5, and one course is selected therefrom (Step ST21). A plurality of courses displayed on the display screen 5 include, for example, an easy beginner course, a difficult advanced course, and an intermediate course having a degree of difficulty between the beginner course and the advanced course. A desired course is selected by suitably operating the operable sections 8a, 8c of the control panel 8 and is determined by pushing the operable section 8b. A plurality of courses in this case correspond to the target motion patterns in which the respective targets 10 are discontinuously displaced.

Next, a plurality opponents (enemies) contained in the selected course and set in advance therefor are displayed as characters on the display screen 5, and one enemy is selected therefrom (Step ST22). The enemy is selected and determined in the same manner as the course is selected and determined. Specifically, the enemy is selected by suitably operating the operable sections 8a, 8c and determined by pushing the operable section 8b. The opponent can be selected at a plurality of stages during one game as described above: for example, at a maximum of 3 stages in the beginner course, and at a maximum of 5 stages in the intermediate and advanced courses. If the operable sections 8a, 8b, 8c are not operated within a predetermined time, the control unit 31 automatically determines the opponent and the ranking, for example, based on the opponent and the ranking set in advance in the control unit 31. Such an automatic determination and the above determination by the game player's operation may be made selectable by operating a push button provided on the main game unit 2. In such a case, the game player can predict the target which will be displaced next if he is used to the game and memorizes the patterns since the target displacement patterns are determined. Thus, brain games can be played.

It is then discriminated whether the selection of the opponent has been completed (Step ST23), and this discrimination is repeatedly made until the selection is completed. Upon the completion of the selection, enemy image data and other data are prepared (Step ST24), the enemy character is caused to appear on the display screen 5 to demonstrate fighting scenes (Step ST25), and an actual game is started (Step ST26). The game started here is the "Usual Enemy Punching Attack Processing" described later. Upon the start of the game, the first and second counters 38, 39 start counting (Step ST27). In this example, the first counter 38 decrements the count value one by one from the value corresponding to the time limit of the game, whereas the second counter 39 increments the count value one by one.

It is then discriminated whether the count value (subtracted value) of the first counter 38 is larger than 0 (Step ST28). Step ST34 follows if the count value ≦0, whereas it is discriminated whether a secrets flag of the game player has been set (Step ST29) if the count value >0. If no flag is set, the "Usual Enemy Punching Attack Processing" is continued (Step ST30). If the flag is set, the game returns to the "Usual Enemy Punching Attack Processing" after proceeding to the "Player's Mortal Punching Attack Processing" (Step ST31).

Next, in Step ST32, it is discriminated whether the enemy's life is equal to 0. This routine returns to Step ST27 if the enemy's life≠0, whereas a player's defeat processing is performed (Step ST34) if the enemy's life=0. The player's defeat processing is performed by expressing the player's defeat by means of, e.g. the loudspeakers 3 and/or the display screen 5. Subsequently, coin insertion is displayed and announced. At this time, if the coin is inserted, continuation of the game is judged in Step ST35 and this routine returns to Step ST22. On the other hand, the game ends if no coin is inserted.

If the enemy life=0 in Step ST32, the victory of the game player is presented by means of the loudspeakers 3 and the display screen 5 (Step ST36), and the game result is then displayed on the display screen 5 (Step ST37).

It is then discriminated whether the game player has fought with a specified number of enemies, i.e. at three stages in the case of the beginner course or at five stages in the case of the intermediate or advanced course (Step ST38). In the present case, the routine returns to Step ST22 to repeat the above operations since the game is still at the first stage. If a judgment that the game player has fought with the specified number of enemies is finally made in Step ST38, the game ends by displaying a message "Game Over".

Figure 13:
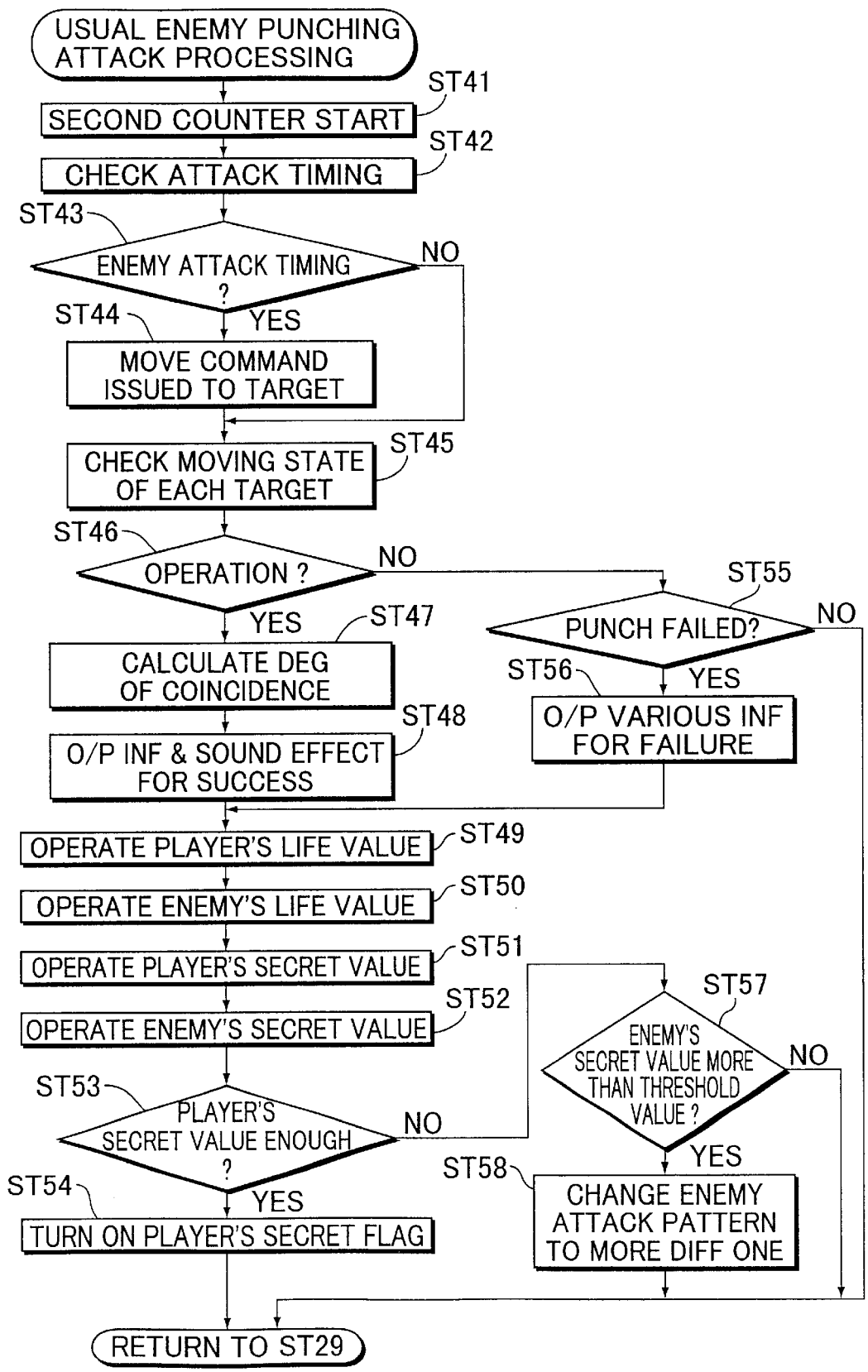
FIG. 13 is a flow chart showing a subroutine "Usual Enemy Punching Attack Processing" executed in the target hitting game machine.

Next, contents of operation in the aforementioned "Usual Enemy Punching Attack Processing" are described with reference to FIG. 13.

First, upon the start of this processing, the second counter 39 starts counting (Step ST41). In the case of the game start in Step ST26, the first and second counters 38, 39 start counting. In the case of return to Step ST30 from Step ST31, only the second counter 39 starts counting. In the latter case, the second counter 39 continues counting which started at the start of the game in Step ST26.

Subsequently, a data table of attack timings is checked in accordance with the count value of the second counter 39 (Step ST42). This data table of attack timings defines which of the six targets 10 is displaced from the laid-down state at the position B to the raised state at the position A in correspondence with the count value. The count value in the data table is compared with an actual count value. Hereinafter, the displacement of the target 10 from the laid-down state at the position B to the raised state at the position A is also referred to as an attack command. Further, the data table is prepared for each enemy character and for each enemy's state (life and secrets value).

When the actual count value of the second counter 39 reaches a specified count value in the data table, it is discriminated whether there still remains any attack command, which is supposed to be executed at this count value or smaller and has not yet been executed, in the data table (Step ST43). If there still remains such an attack command, an attack command is issued for the corresponding target 10 (Step ST44). Subsequently, the moved states of the respective targets 10 are checked (Step ST45). On the other hand, if there is no such attack command in Step ST43, Step ST45 directly follows.

It is then discriminated whether the target 10 has been hit by the game player, i.e. a hitting motion has been made (Step ST46). If the target 10 has been hit, degree of timing coincidence is calculated (Step ST47). This calculation is made based on a difference between an angle of the target 10 when being hit and an optimal angle corresponding to the hitting timing.

An information and a sound effect corresponding to a successful hitting motion are then outputted (Step ST48), and the player's life value is increased or decreased according to the information (Step ST49). Subsequently, the enemy's life value is increased or decreased according to the information (Step ST50), the player's secrets value is increased or decreased according to the information (Step ST51), and the enemy's secrets value is increased or decreased according to the information (Step ST52).

It is then discriminated whether the player's secrets value is a predetermined value or larger (Step ST53). If so, the game player's secrets flag is set (Step ST54) and this routine returns to Step ST29. If the player's secrets value is below the predetermined value, it is discriminated whether the enemy's secrets value is a predetermined value or larger (Step ST57). If the enemy's secrets value is below the predetermined value, this routine returns to Step ST29 of the main routine shown in FIG. 12. If the enemy's secrets value is the predetermined value or larger, the displacement pattern of the targets 10 is switched from the pattern shown in FIG. 15 to the more difficult pattern shown in FIG. 16 for only a predetermined time (Step ST58).

If no hitting motion is discriminated to have been made in Step ST46, it is judged whether the punch has failed (Step ST55). This routine returns to Step ST29 of the main routine unless the punch has failed. In the case of the failed punch, various pieces of failure information are outputted to the loudspeakers 3 and the display screen 5 (Step ST56) and Step ST49 follows.

Figure 14:
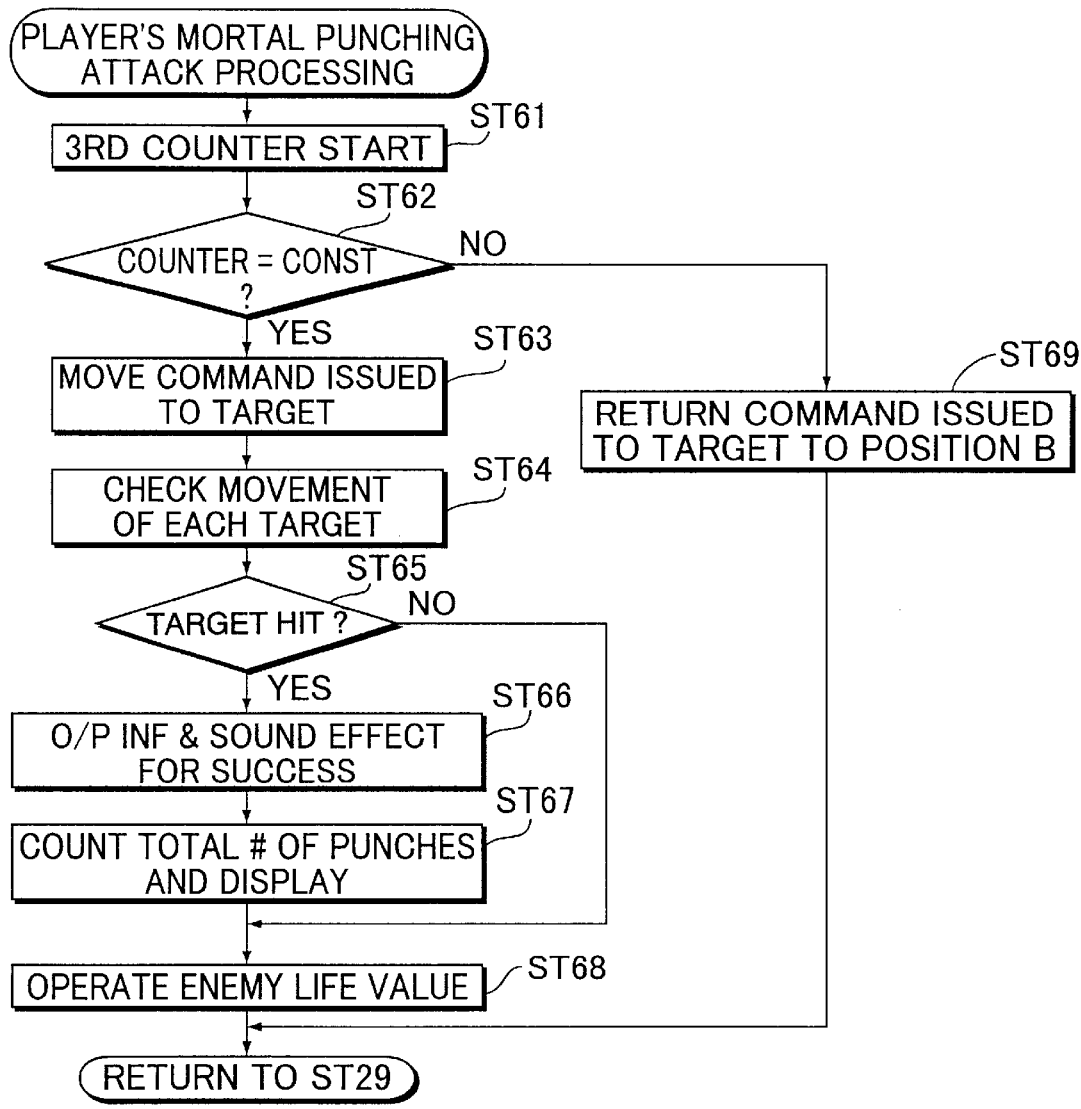
FIG. 14 is a flow chart showing a subroutine "Player's Mortal Punching Attack Processing" executed in the target hitting game machine.

Next, contents of operation in the aforementioned "Player's Mortal Punching Attack Processing" are described with reference to FIG. 14. As described above, this processing is executed when the game player's secrets flag is set.

First, after the secrets flag is set, i.e. after the start of the "Player's Mortal Punching Attack Processing", the third counter 40 starts counting (Step ST61). It is then discriminated whether the count value of the third counter 40 has reached a predetermined value (Step ST62). If so, a movement command is issued to all the targets 10 for the continuous hitting motions (Step ST63). As a result, all the targets 10 make continues motions regardless of whether or not the game player actually hit them. Subsequently, the moved states of the respective targets 10 are checked (Step ST64).

It is then discriminated whether the target 10 has been hit (Step ST65). If so, an information and a sound effect corresponding to a successful hitting motion are outputted (Step ST66), and a total number of punches is counted and displayed (Step ST67), followed by Step ST68. On the other hand, unless the target 10 has been hit, Step ST68 directly follows.

In Step ST68, the enemy's life value is increased or decreased according to the information. Here, only the enemy's life value is increased or decreased without increasing or decreasing the player's life value. Then, this routine returns to Step ST29 of the main routine shown in FIG. 12.

On the other hand, unless the count value has reached the predetermined value in Step ST62, a return command is issued to return the target 10 to the position B (Step ST69). In this way, a preparation to return to the "Usual Enemy Punching Attack Processing" is performed.

Figure 12:
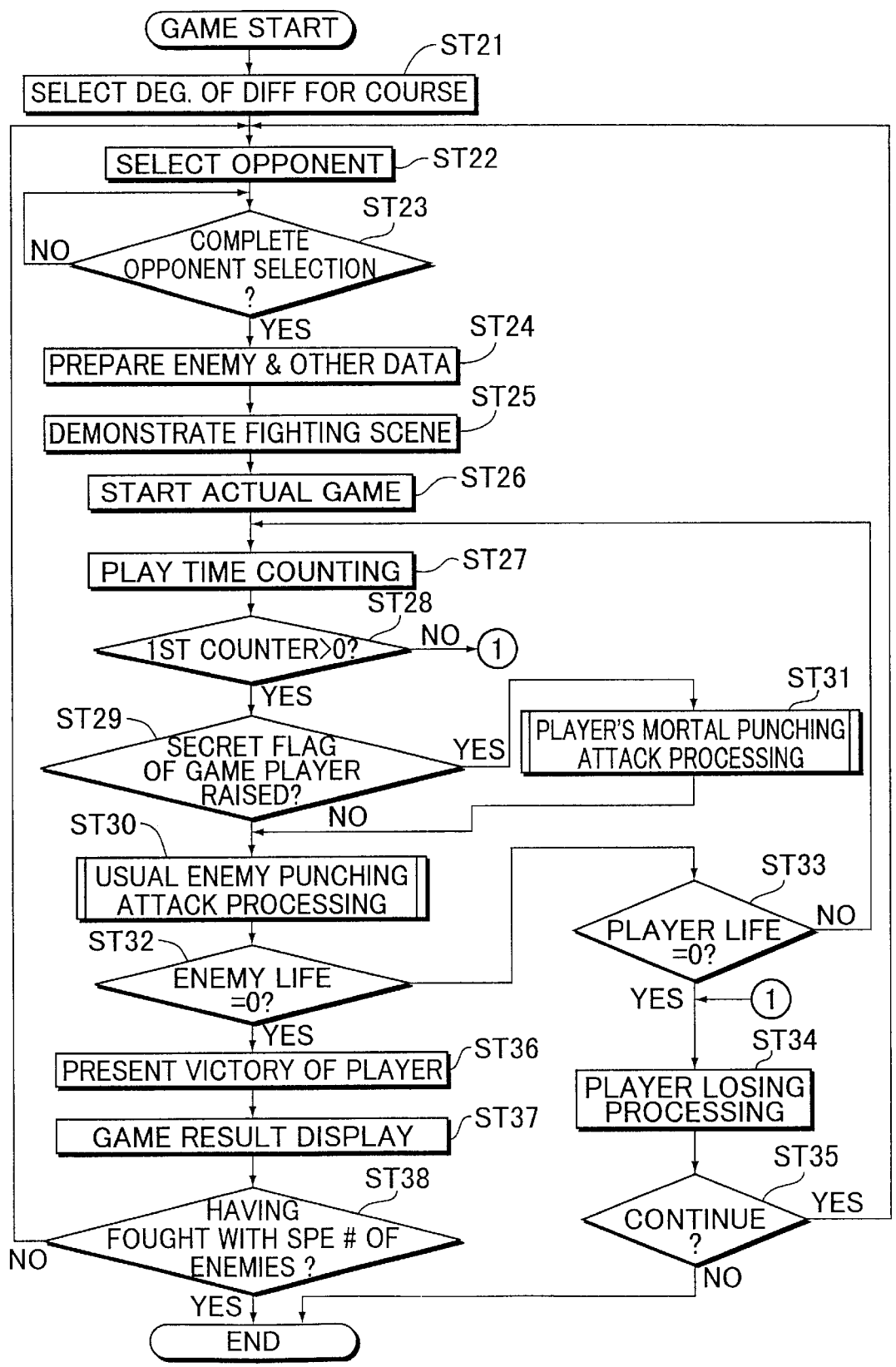
FIG. 12 is a main flow chart showing contents of operation in the target hitting game machine.

Thereafter, the "Usual Enemy Punching Attack Processing" is executed in Step ST29 of the main routine shown in FIG. 12. If the game player's secrets flag is set during the return, the game returns to the main routine after proceeding to the "Player's Mortal Punching Attack Processing". Thus, if the game player's secrets flag is set once or twice during one stage, the game progresses by returning to the "Usual Enemy Punching Attack Processing" after proceeding to the "Player's Mortal Punching Attack Processing" every time.

In the case of the "Player's Mortal Punching Attack Processing" which necessitates the continuous hitting motions, such a difficult pattern as to cause the game player to fail to hit is adopted. However, if the game player successfully hits the targets 10, he can get a high score, leading to a better result.

In the embodiment thus construction, three each of the six targets 10 are arrayed on the left and right sides of the front surface of the main game unit 2 at different height positions, and the targets 10 are displaced from the back side to the front side of the main game unit 2, i.e. the targets 10 are displaced toward the game player. Thus, a highly ingenuous target hitting game can be realized.

Further, how the target 10 was hit is judged, this judgment is converted into a numerical value, and the "Player's Mortal Punching Attack Processing" is executed instead of the "Usual Enemy Punching Attack Processing" if the sum of the converted values exceeds a predetermined value. Thus, in this embodiment, the ingenuity of the game can be improved.

Although three each of the six targets 10 are arrayed on the left and right sides of the front surface of the main game unit 2 at three different levels of high, middle and low in the foregoing embodiment, it is sufficient to provided at least three targets 10 to be hit and to array them at the left and right sides such that the targets 10 on at least one side are located at different heights. In the case of such an arrangement of the targets 10, the targets 10 are present at different heights and are displaced from the back side to the front side of the main game unit, i.e. are displaced toward the game player. Thus, a highly ingenuous target hitting game can be realized.

Further, as shown in phantom line in FIGS. 1 and 4, additional targets 10 may be rotatably provided in the transversely middle part. Such targets 10 may be rotatable about vertical axes like the left and right targets 10. However, in the case of a narrow space, these targets 10 may be rotatable about horizontal axes toward the bottom side or the ceiling side. This leads to an increase in the number of the targets 10 arrayed, making the game player easier to be puzzled as to which target he should hit, with the result that the ingenuity of the game can be improved.

In the foregoing embodiment, the blue LEDs are turned on when the target reaches an angle 10° before the optical hitting angle (position A) while the target is moved from the position B to the position A. When the target reaches a position 10° from the optimal hitting angle while returning in reverse direction, the blue LEDs are turned off and, instead, the red LEDs are turned and kept on until the target reaches the position B. However, the present invention is not limited thereto. For example, the light source may be kept on in red until the target reaches a specified angle (not limited to 10°) before the optimal hitting angle while moving from the position B to the position A, and the light source having been turned on in red may be turned off when the target reaches a specified angle (not limited to 10°) from the optimal hitting angle while returning in reverse direction or may be kept on in red until the target returns to the position B. In other words, it is sufficient to make at least the start of the hitting timing slightly before the optimal hitting angle visibly recognizable.

Figure 17:
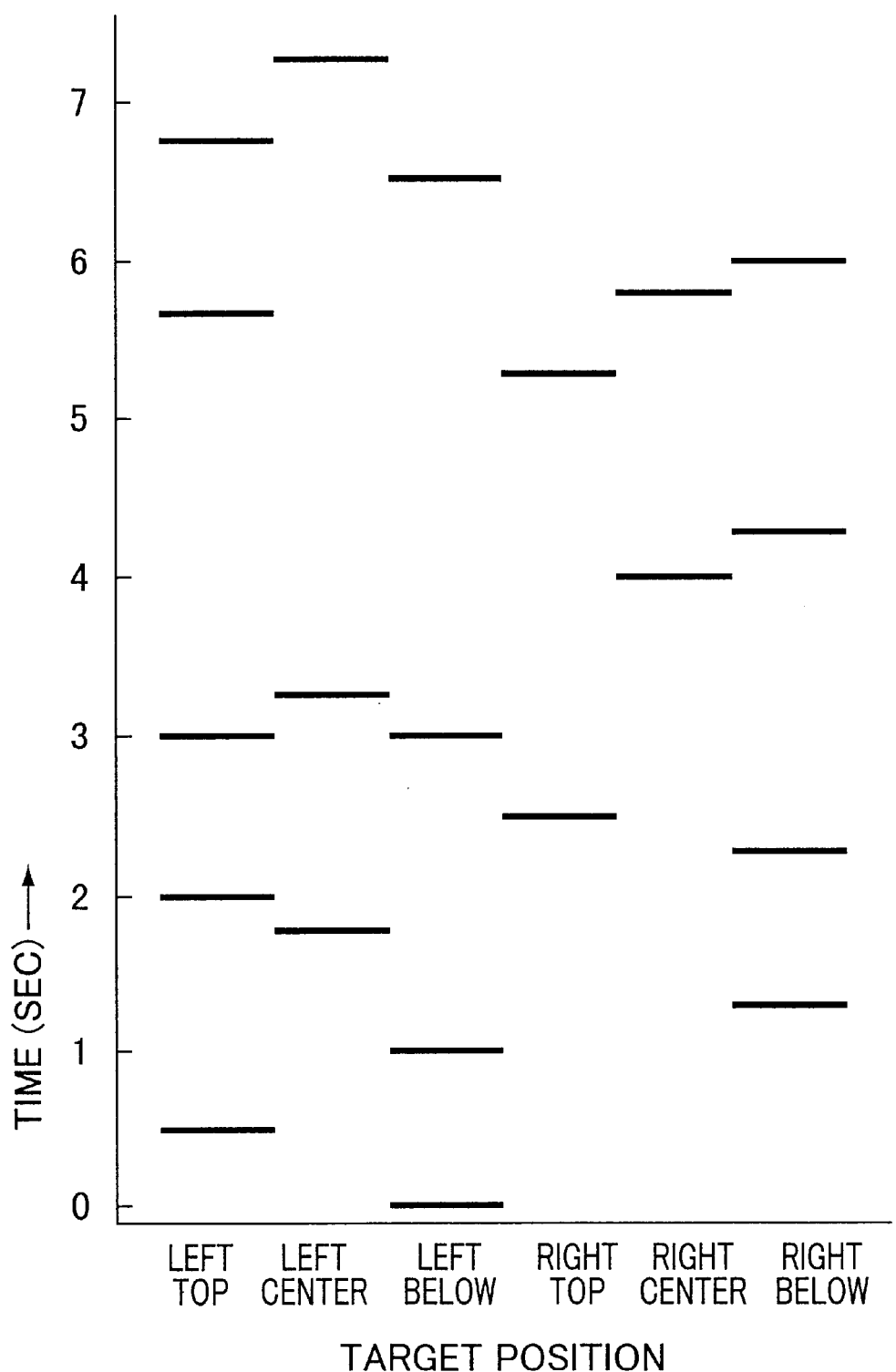
FIG. 17 is a diagram showing an example of an other pattern adopted in the "Player's Mortal Punching Attack Processing" in the target hitting game machine.

Further, although the target displacement pattern in which the targets are continuously moved to make it difficult for the game player to hit them is used in the "Player's Mortal Punching Attack Processing" in the foregoing embodiment, the present invention is not limited thereto. For example, there may be used such target displacement patterns in which the targets are randomly moved so that it is difficult for the game player to judge which target should be hit next. An example of such patterns is shown in FIG. 17. Thick horizontal lines represent timings at which the targets 10 are displaced from the position B to the position A. In the case of this pattern, the number of target hitting motions required is smaller, but it is difficult for the game player to judge which target should be hit next since the targets are randomly moved.

In the case that the above random pattern is adopted, the judgment criteria shown in TABLE-1 may be made stricter; the target may be judged to have been hit only when it was hit between −3° and +3° while being judged to have been missed unless otherwise; and a game to complete the secrets may be executed if the game player hits all targets 10. Upon completion of the secrets, for example, a processing to increase the number of stages or reduce the enemy's life value to 0 may be executed. Such a processing significantly improves the ingenuity of the game.

Although the angle range within which the target is assumed to be hit is between −3° and +3° in the above example, it is not limited thereto.

Although the judgments of estimations of the game are made in accordance with the angle ranges shown in TABLE-1, the life value conversion is made in accordance with the angle ranges shown in TABLE-2, and the secrets value conversion is made in accordance with the angle ranges shown in TABLE-3 in the foregoing embodiment, the present invention is not limited thereto. The judgments of estimations of the game may be made in accordance with angle ranges different from those listed in TABLE-1 or the number of judgment levers may be changed from 5 to an other number. The life value conversion may be made in accordance with angle ranges different from those listed in TABLE-2 or the life value adjustment numbers may be changed from 3 to an other number. The secrets value conversion may be made in accordance with angle ranges different from those listed in TABLE-3 or the secrets value adjustment numbers may be changed from 5 to an other number.

Although not mentioned in the foregoing embodiment, the targets may be hit by any part of the game player's hands. For example, the targets may be hit by the game player's fists or may be hit by being pushed by the palms of his hands. In other words, it does not matter how the targets are hit as long as they can be displaced at a speed exceeding a predetermined threshold value. Further, gloves may be worn to hit the targets.

Further, although whether or not the target has been hit is judged by comparing the speed per unit time while the target is being laid down by being hit by the game player with the threshold value in the foregoing embodiment, the present invention is not limited thereto. The above judgment may be made based on a difference between an angular position where the target is supposed to be located when it is not hit and an angular position detected by the detection sensor 27 when it is hit. In such a case, judgment may be made based on the difference between the angle detected by the detection sensor 27 when the target is hit and the optimal hitting angle, for example, in accordance with TABLE-1, and the life value and the secrets value may be converted in accordance with TABLE-2 and TABLE-3 to evaluate the game result.

Further, according to the present invention, the returning speed of the target to the laid-down position may be detected by a change of the angle detected by the detection sensor 27, and the target hitting strength of the game player judged based on this detection may be reflected on the game result.

As described in detail above, at least three targets are arrayed on the left and right sides of the front surface of the main game unit while being located at different height positions on at least one of the left and right sides. Accordingly, in the case of a minimum number of targets, two targets can be arrayed at different height positions on the right side if the number of the targets on the right side is larger than that on the left side. Further, the targets are displaced from the back side to the front side of the main game unit, i.e. are displaced toward the game player. Furthermore, since the game result is judged based on the angles at which the targets were hit, it can be judged stepwise, with the result that a high ingenuous target hitting game can be realized.

If one or two targets to be hit are additionally provided at the transverse middle part of the front surface of the main game unit, the positions of the targets can be differed not only with respect to height direction, but also with respect to transverse direction.

If a plurality of targets are arrayed at different height positions on each of the left side, the right side and the transverse middle part of the front surface of the main game unit, an attacking area is enlarged since many targets are arrayed both with respect to height direction and with respect to transverse direction. Thus, the ingenuity of the game can be significantly improved.

The target hitting game machine is further provided with the target motion pattern storage for storing a plurality of specified patterns to control the displacements of all the targets, and the selecting means for selecting one of the plurality of specified patterns, and the targets are displaced based on the specified pattern selected by the selecting means.

With such a construction, one, two or more specified patterns can be selected from the plurality of specified patterns stored in the target motion pattern storage by the selecting means when the game is to be played. Thus, the targets can be hit in patterns different from the specified pattern, making it less monotonous as compared to a case where the targets are hit in the specified pattern.

The target hitting game machine is further provided with the display means for displaying as animated images the characters selected by the selecting means from a plurality of characters as opponents set in correspondence with the plurality of specified patterns stored in the target motion pattern storage, and the targets are moved in synchronism with the motion of the character displaced on the display means. With such a construction, the game can be played, assuming the presence of the opponent since the character of the opponent is displayed in an animated manner to move at a specified speed and the targets are similarly moved. As a result, the ingenuity of the game can be improved.

Each target is provided with the light source for indicating the hitting timing, and the light source is turned on to visually indicate the hitting timing when the target passes the specified position while being displaced from the back side to the front side. Alternatively, the color of the turned light source is changed from a specified color to an other color to visually indicate the hitting timing when the target passes the specified position while being displaced from the back side to the front side. With such constructions, since the game player can visually judge the hitting time based on the displaced amount of the target without using his intuition, a possibility of not hitting the target which should be hit can be suppressed.

Each target is mounted on the target mounting means rotatably provided about the axis within the specified angle range, and the motor and the motor drive transmission system for rotating the target mounting means are provided, so that the motor drive transmission system is disconnected when the target is hit while being displaced from the back side to the front side, and the target returns to the back by the hitting force. With such a construction, since the target is rotated via the target mounting means, restriction on the target hitting angle of the game player can be alleviated as compared to a construction in which the targets are moved forward and backward.

Each target is provided with the hit detecting means for detecting the angular position where the target is hit, and the game result evaluating means is provided for judging the hit state of the target based on the angular position detected by the hit detecting means and the optimal hitting angle stored in advance in the game result evaluating means. With such a construction, the game result evaluating means can make stepwise judgments on the game result based on the angular position detected by the hit detecting means and the optimal hitting angle.

The hit detecting means includes the angle sensor for detecting an angle of rotation of the target and the angle difference detecting means for calculating an angle difference between the angle detected by the angle sensor when the target is hit and inputted to the angle difference detecting means and the optimal hitting angle stored in the angle difference detecting means, and the game result evaluating means judges the hit state of the target by the game player based on the angle difference inputted from the angle difference detecting means. With such a construction, when the target is angularly displaced by being hit, the resulting angle change is detected by the angle sensor. The angle difference detecting means calculates the angle difference between the angle change detected by the angle sensor when the target is hit and the optimal hitting angle. The game result evaluating means can judge the hit state of the target, i.e. how much the angle at which the target is actually hit is displaced from or close to the optimal hitting angle.

The game result evaluating means includes the secrets value estimating means for converting the hit states of the targets into evaluation values based on the angle difference calculated by the angle difference detecting means and adding the converted values, and the target displacement pattern is switched between the first specified pattern and the second specified pattern having different degrees of difficulty based on the sum of the converted values added by the secrets value estimating means. With such a construction, the ingenuity of the game is significantly improved since the specified pattern in which the targets are displaced is changed midway depending on how the targets have been hit.

The first specified pattern is a pattern for displacing the targets to the advantage of the game player, whereas the second specified pattern is a pattern for displacing the targets to the disadvantage of the game player. With such specified patterns, the motions of the targets are changed between the state where it is easy for the game player to hit the targets (state leading to a good result) and the state where it is difficult for him to hit them (state leading to a bad result). Thus, the ingenuity of the game can be significantly improved.

The game player evaluation means is provided for converting the hit states of the targets into the game player's evaluation values based on the angle differences calculated by the angle difference detecting means and adding the converted values, and the victory of the character is judged based on the sum of the evaluation values added by this estimating means to end the game. With such a construction, the game player tries harder to win since the game is ended if the character wins. Thus, the ingenuity of the game can be significantly improved.

At least the front surface of each target is formed of a shock absorbing member. With such targets, there is no likelihood of injuring hands or the like even if the targets are hit by bare hands, thereby suppressing pains felt in the hands.

The display means includes the display screen, and the hit mark indicating that the game player has successfully hit the target is displayed in connection with the position of the hit target. With such a construction, the game player can visually judge that he has successfully hit the target since the hit mark is displayed on the display screen in connection with the position of the hit target. Thus, the game player tries harder to display more hit marks, with the result that the ingenuity of the game can be significantly improved.

The display means displays the character in an animated manner such that the attacking position of the character displayed on the display screen corresponds to the position of the target being rotated. With such a construction, since the game player can visually recognize the coincidence between the attacking position of the character on the display screen and the position of the target being displaced, the ingenuity of the game can be further improved.

Moreover, the targets need not be in rotatably movable between the hitting position and the standby position. As long as the targets are movable between these two positions and the game result evaluating unit is capable of evaluating the position therebetween, then the object of this invention in view of the prior art can be achieved.

This application is based on Japanese application serial no. HEI 11-335112 filed on Nov. 25, 1999, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A target hitting game machine comprising:
   a main game unit;
   at least three targets which are arrayed on the left and right sides of the front surface of the main game unit while being located at different height positions on at least one of the left and right sides, each of the targets is rotatably movable between a hitting position and a standby position; and
   a game result evaluating unit for evaluating a game result in accordance with a position of the target when hit by a player between the hitting position and the standby position.

2. The target hitting game machine according to claim 1, wherein at least one target is additionally provided at the transverse middle part of the front surface of the main game unit.

3. The target hitting game machine according to claim 2, wherein said at least one target includes targets arrayed at different height positions on each of the left side, the right side and the transverse middle part of the front surface of the main game unit.

4. The target hitting game machine according to claim 1, further comprising:
   a target motion pattern storage for storing a plurality of specified patterns to control the displacements of all the targets; and
   selecting means for selecting one of the plurality of specified patterns so that the targets are displaced based on the specified pattern selected by the selecting means.

5. The target hitting game machine according to claim 4, further comprising display means for displaying, as animated images, particular characters selected by the selecting means from a plurality of characters as opponents set in correspondence with the plurality of specified patterns stored in the target motion pattern storage, the targets being moved in synchronism with the motion of the particular characters displayed on the display means.

6. The target hitting game machine according to claim 1, further comprising a light source for indicating a hitting timing, the light source being turned on to visually indicate the hitting timing when the target passes a specified position while being displaced from the standby position to the hitting position.

7. The target hitting game machine according to claim 6, wherein the color of the light source while turned on is changed from a specified color to another color to visually indicate the hitting timing when the target passes the specified position while being displaced from the standby position to the hitting position.

8. The target hitting game machine according to claim 1, further comprising:
   target mounting means provided on the main game unit such that each of the targets is rotatably mounted around an axis of the target mounting means within a specified angle range;
   a motor; and
   a motor drive transmission system for rotating the target mounting means and wherein the motor drive transmission system is disconnected when the target is hit while being displaced from the standby position to the hitting position, and the target returns to the standby position by a hitting force.

9. The target hitting game machine according to claim 1, wherein:
   each target is provided with hit detecting means for detecting an angular position when the target is hit; and
   the game result evaluating means judges a hit state of the target in accordance with the angular position detected by the hit detecting means and an optimal hitting angle stored in advance in the game result evaluating means.

10. The target hitting game machine according to claim 9, wherein:
   the hit detecting means includes an angle sensor for detecting an angle of rotation of the target and angle difference detecting means for calculating an angle difference between the angle detected by the angle sensor when the target is hit and the optimal hitting angle stored in the game result evaluating means; and
   the game result evaluating means judges the hit state of the target by a game player based on the angle difference inputted from the angle difference detecting means.

11. The target hitting game machine according to claim 10, wherein:
   the game result evaluating means includes secrets value estimating means for converting the hit states of the targets into evaluation values based on the angle difference calculated by the angle difference detecting means and adding the evaluation values; and
   a target displacement pattern is switched between a first specified pattern and a second specified pattern having different degrees of difficulty based on the sum of the evaluation values added by the secrets value estimating means.

12. The target hitting game machine according to claim 11, wherein the first specified pattern is a pattern for displacing the targets to an advantage of the game player whereas the second specified pattern is a pattern for displacing the targets to a disadvantage of the game player.

13. The target hitting game machine according to claim 10, wherein:
   the game result evaluating means is provided for converting the hit states of the targets into evaluation values of the game player based on the angle differences calculated by the angle difference detecting means and adding the evaluation values; and
   a victory of the character which ends the game is judged based on the sum of the evaluation values.

14. The target hitting game machine according to claim 1, wherein at least the front surface of each target is formed of a shock absorbing member.

15. The target hitting game machine according to claim 5, wherein:
   the display means includes a display screen; and
   a hit mark indicating that the game player has successfully hit the target is displayed in connection with a position of the hit target.

16. The target hitting game machine according to claim 15, wherein the display means displays the particular characters in an animated manner such that an attacking position of a given one of the particular characters displayed on the display screen corresponds to the position of the target being rotated.

17. A target hitting game machine comprising:
   a main game unit;
   at least three targets which are arrayed on the left and right sides of the front surface of the main game unit while being located at different height positions on at least one of the left and right sides, each of the targets is movable between a hitting position and a standby position; and
   a game result evaluating unit for evaluating a game result in accordance with a position of the target when hit by a player between the hitting position and the standby position.

18. The target hitting game machine according to claim 17, wherein the each of the targets is rotatably provided on the main game unit so that each target is angularly displaceable between the standby position and the hitting position.

19. A single player target hitting game machine, comprising:
   a main game unit;
   at least three targets to be hit by a single player which are arrayed on the left and right sides of the front surface of the main game unit while being located at different height positions on at least one of the left and right sides, each of the targets being movable between a hitting position and a standby position; and
   a game result evaluating unit for evaluating a game result in accordance with a position of the target when hit by the single player between the hitting position and the standby position.

20. A target hitting game machine, comprising:
   a main game unit;
   at least three targets which are arrayed on the left and right sides of the front surface of the main game unit while being located at different height positions on at least one of the left and right sides, each of the targets being rotatably mounted on the main game unit for rotation about a vertical axis to be movable between a hitting position and a standby position; and
   a game result evaluating unit for evaluating a game result in accordance with a position of the target when hit by a player between the hitting position and the standby position.

21. A target hitting game machine, comprising:

a main game unit;

two sets of at least three targets each, arrayed respectively on a left side and a right side of a front surface of the main game unit at different height positions, each of the targets being mounted on the main game unit in a manner permitting movement between a hitting position and a standby position; and a game result evaluating unit for evaluating a game result at least partially in accordance with a relative position of a particular one of the targets between the hitting position and the standby position when the particular one of the targets is hit by a player.

22. The target hitting game machine according to claim 21, wherein each of the targets is rotatably mounted on the main game unit for rotation about a vertical axis.

23. The target hitting game machine according to claim 22, wherein:

each of the targets is provided with hit detecting means for detecting an angular position when the particular one of the targets is hit; and the game result evaluating means judges a hit state of the particular one of the targets in accordance with the angular position detected by the hit detecting means and an optimal hitting angle stored in advance in the game result evaluating means.

24. The target hitting game machine according to claim 21, further comprising:

target mounting means provided on the main game unit such that each of the targets is rotatably mounted around an axis of the target mounting means for movement thereof within a specified angle range;

a motor; and a motor drive transmission system for rotating the target mounting means, the motor drive transmission system being disconnected when the particular one of the targets is hit while being displaced from the standby position to the hitting position, thereby permiting the particular one of the targets to return to the standby position by a hitting force transferred thereto by the player.

* * * * *